(12) United States Patent
Hanley

(10) Patent No.: US 11,690,467 B2
(45) Date of Patent: *Jul. 4, 2023

(54) ROD BRACKET

(71) Applicant: Kenney Manufacturing Company, Warwick, RI (US)

(72) Inventor: Michael P. Hanley, Smithfield, RI (US)

(73) Assignee: Kenney Manufacturing Company, Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,069

(22) Filed: Feb. 21, 2020

(65) Prior Publication Data
US 2020/0200199 A1 Jun. 25, 2020

Related U.S. Application Data

(63) Continuation-in-part of application No. 16/358,204, filed on Mar. 19, 2019, and a continuation-in-part of
(Continued)

(51) Int. Cl.
*A47H 1/142* (2006.01)
*F16B 2/06* (2006.01)
*F16B 45/00* (2006.01)

(52) U.S. Cl.
CPC ............. *A47H 1/142* (2013.01); *F16B 2/065* (2013.01); *F16B 45/00* (2013.01)

(58) Field of Classification Search
CPC .......... A47H 1/10; A47H 1/102; A47H 1/104; A47H 1/12; A47H 1/122; A47H 1/124;
(Continued)

(56) References Cited

U.S. PATENT DOCUMENTS 102,945 A * 5/1870 Judd et al. ......... A47G 25/0607
248/547
229,873 A * 7/1880 Day ................... A47G 25/0607
248/217.4
(Continued)

FOREIGN PATENT DOCUMENTS

EP 1619397 A1 1/2006
EP 1748196 A1 1/2007
WO 2009/039578 A1 4/2009

Primary Examiner — Ingrid M Weinhold
(74) Attorney, Agent, or Firm — Adler Pollock & Sheehan P.C.

(57) ABSTRACT

An anchorless-installed wall-mount bracket system comprising a plurality of wall-penetrating fasteners. A wall-mount portion constructed to orient the wall-penetrating fasteners for supporting a load. A load bearing portion constructed to support the load at a hanging distance from the wall-mount portion. The load bearing portion extending laterally away from the wall-mount portion. A finial attachment feature constructed to support any one of a plurality of distinct finials adapted for use with the wall-mount bracket system. The finial attachment feature disposed on the load bearing portion so that a finial attached thereto is at least partially exposed beyond the load when the load is disposed at the hanging distance.

10 Claims, 33 Drawing Sheets

Related U.S. Application Data application No. 16/018,979, filed on Jun. 26, 2018, now Pat. No. 10,648,492, said application No. 16/018,979 is a continuation of application No. 15/488,781, filed on Apr. 17, 2017.

(60) Provisional application No. 62/644,889, filed on Mar. 19, 2018, provisional application No. 62/384,895, filed on Sep. 8, 2016.

(58) Field of Classification Search
CPC .......... A47H 1/14; A47H 1/142; A47H 1/144; A47G 25/0607; A47G 25/0635; A47G 7/044; F16B 2/065; F16B 45/00; A47B 96/061
USPC .............. D8/363; 248/262, 261, 220.22, 314
See application file for complete search history.

(56) References Cited

U.S. PATENT DOCUMENTS

| | | | | |
|---|---|---|---|---|
| 232,644 | A | * | 9/1880 | Judd ...................... A47H 1/142 248/262 |
| 374,340 | A | * | 12/1887 | Brass ...................... A47H 1/122 248/265 |
| 378,087 | A | | 2/1888 | Field |
| D23,731 | S | * | 10/1894 | Burgess ........................ D8/381 |
| 762,733 | A | * | 6/1904 | Malmquist .............. A47H 1/142 248/263 |
| 769,859 | A | * | 9/1904 | Fanning ................. A47H 1/142 248/263 |
| 824,067 | A | * | 6/1906 | Dennis ..................... A47H 1/13 248/256 |
| 327,627 | A | | 7/1906 | Graham |
| 827,272 | A | * | 7/1906 | Tait ........................ A47H 1/122 248/265 |
| 917,601 | A | | 4/1909 | Heinrichs |
| 937,457 | A | * | 10/1909 | Moffat ................... A47H 1/142 248/263 |
| 965,658 | A | | 7/1910 | Reubel |
| 969,051 | A | * | 8/1910 | Garraway et al. ........ A47H 1/13 248/254 |
| 1,033,440 | A | * | 7/1912 | Moffat ................... A47H 1/142 248/262 |
| 1,049,355 | A | * | 1/1913 | Haller .................... A47H 1/142 248/262 |
| 1,057,043 | A | | 3/1913 | Dohm |
| 1,141,757 | A | * | 6/1915 | Bitting .................... A47H 1/13 248/257 |
| 1,147,355 | A | | 7/1915 | Zevin |
| 1,249,955 | A | | 12/1917 | Hendrickson et al. |
| 1,392,405 | A | * | 10/1921 | Dougherty ............... A47H 1/13 248/258 |
| D60,744 | S | | 3/1922 | Weyman |
| 1,475,576 | A | | 11/1923 | Stephen |
| 1,529,335 | A | * | 3/1925 | Winkler ................... A47H 1/13 248/257 |
| D70,831 | S | * | 8/1926 | Dlouhy ........................ D8/363 |
| D75,598 | S | | 6/1928 | Priest |
| D76,096 | S | | 8/1928 | Vermillion |
| D76,097 | S | | 8/1928 | Vermillion |
| D76,109 | S | | 8/1928 | Vermillion |
| D76,546 | S | | 10/1928 | Madvig |
| 1,794,700 | A | | 3/1931 | Mccaskey |
| 2,219,075 | A | * | 10/1940 | Le Veau .................. A47H 15/00 4/610 |
| 2,224,008 | A | | 12/1940 | Auslander |
| 2,261,505 | A | | 11/1941 | Schlesinger |
| 2,298,380 | A | | 10/1942 | Hood |
| 2,679,373 | A | | 5/1954 | Henley |
| 2,693,927 | A | | 11/1954 | Gardner |
| 2,859,879 | A | * | 11/1958 | Rogers ................. A47B 96/027 211/90.01 |
| 2,893,676 | A | | 7/1959 | Connors et al. |
| 2,908,471 | A | | 10/1959 | Hollansworth |
| 2,965,339 | A | | 12/1960 | Denton |
| 3,131,251 | A | | 4/1964 | Ryan |
| 3,506,135 | A | | 4/1970 | Klingaman |
| 3,596,861 | A | | 8/1971 | Baldini |
| 3,614,045 | A | | 10/1971 | Cegielski, Jr. |
| 3,669,395 | A | * | 6/1972 | Gehrke ...................... A47F 5/08 248/235 |
| 3,733,043 | A | | 5/1973 | Binns et al. |
| 3,848,843 | A | | 11/1974 | Levy |
| 3,861,631 | A | | 1/1975 | Shorin |
| 3,889,912 | A | | 6/1975 | Ray |
| 3,912,211 | A | | 10/1975 | Topf |
| 3,928,894 | A | | 12/1975 | Bury et al. |
| 3,991,963 | A | * | 11/1976 | Solo ...................... A47H 1/142 248/216.1 |
| D244,668 | S | | 6/1977 | Tegner |
| 4,140,294 | A | | 2/1979 | Zwarts |
| 4,162,721 | A | | 7/1979 | Moriya |
| D256,864 | S | * | 9/1980 | Nippel ........................... D6/549 |
| D259,241 | S | | 5/1981 | Lynch et al. |
| 4,322,050 | A | | 3/1982 | Roach |
| 4,325,528 | A | | 4/1982 | Martin |
| D265,285 | S | | 7/1982 | Englert, Jr. |
| 4,340,199 | A | | 7/1982 | Brock |
| 4,381,578 | A | | 5/1983 | Glejf |
| D279,450 | S | | 7/1985 | Chap |
| 4,555,432 | A | | 11/1985 | Bossons |
| D281,575 | S | | 12/1985 | Chap |
| 4,606,526 | A | | 8/1986 | Rabinowitz |
| D285,410 | S | | 9/1986 | Webber |
| 4,662,593 | A | | 5/1987 | Shames et al. |
| D290,224 | S | | 6/1987 | Skinner |
| D290,931 | S | | 7/1987 | Powell |
| 4,684,095 | A | | 8/1987 | Athey |
| 4,718,625 | A | | 1/1988 | Boda |
| 4,883,247 | A | | 11/1989 | Crandall |
| 4,898,409 | A | | 2/1990 | Carter |
| D307,539 | S | | 5/1990 | Goodman et al. |
| 4,979,713 | A | | 12/1990 | Bell |
| 5,000,411 | A | | 3/1991 | Primeau |
| D315,862 | S | | 4/1991 | Specker, Jr. |
| D316,031 | S | | 4/1991 | Goodman et al. |
| 5,011,030 | A | | 4/1991 | Alaurent |
| 5,018,697 | A | | 5/1991 | Treanor et al. |
| 5,069,412 | A | | 12/1991 | Jacob |
| D327,642 | S | | 7/1992 | Foubister |
| D329,372 | S | | 9/1992 | Wilms |
| 5,178,355 | A | | 1/1993 | Herzig |
| D334,135 | S | * | 3/1993 | Fraker ........................... D8/381 |
| 5,244,186 | A | | 9/1993 | Chandler |
| D346,950 | S | | 5/1994 | Dunn et al. |
| 5,351,842 | A | | 10/1994 | Remmers |
| 5,398,900 | A | | 3/1995 | Schober |
| 5,433,416 | A | | 7/1995 | Johnson |
| 5,480,120 | A | | 1/1996 | Bruner |
| 5,542,641 | A | | 8/1996 | Donovan |
| 5,549,407 | A | | 8/1996 | Levi et al. |
| D373,719 | S | | 9/1996 | Lin |
| 5,564,666 | A | | 10/1996 | Pfeil |
| 5,582,303 | A | | 12/1996 | Sloan |
| D389,035 | S | | 1/1998 | Smiley et al. |
| 5,876,147 | A | | 3/1999 | Longo |
| D411,737 | S | * | 6/1999 | Vogt ............................. D8/373 |
| 5,921,518 | A | | 7/1999 | Bernardi |
| 6,042,078 | A | | 3/2000 | Donovan |
| D433,619 | S | | 11/2000 | Rowan |
| 6,216,889 | B1 | | 4/2001 | Chang |
| 6,302,614 | B1 | | 10/2001 | Tseng |
| D455,334 | S | | 4/2002 | Ivankovic |
| D459,978 | S | | 7/2002 | Hollinger |
| 6,431,510 | B1 | | 8/2002 | Lydecker |
| 6,439,520 | B1 | | 8/2002 | Johnson |
| 6,520,463 | B1 | | 2/2003 | Ouano |
| 6,629,680 | B2 | | 10/2003 | Week et al. |
| 6,695,276 | B2 | | 2/2004 | Skorka |
| D495,589 | S | * | 9/2004 | Goodman ...................... D8/367 |
| D511,088 | S | | 11/2005 | Chiu |
| D516,900 | S | * | 3/2006 | Hoernig ........................ D8/367 |

(56) References Cited

U.S. PATENT DOCUMENTS

| | | |
|---|---|---|
| D517,402 S | 3/2006 | Cairns |
| 7,128,124 B2 | 10/2006 | Bibby et al. |
| 7,198,088 B2 | 4/2007 | McMenamin et al. |
| D552,455 S * | 10/2007 | Moore .......................... D8/363 |
| 7,287,734 B2 | 10/2007 | Bell |
| D554,982 S * | 11/2007 | Wenck .......................... D8/376 |
| D557,595 S * | 12/2007 | Ernst .......................... D8/367 |
| 7,370,839 B2 | 5/2008 | Putman |
| D572,574 S * | 7/2008 | Lee .......................... D8/363 |
| 7,431,067 B2 * | 10/2008 | Nien .......................... A47H 1/00 16/87 R |
| 7,497,028 B2 | 3/2009 | Nevers et al. |
| D591,143 S | 4/2009 | Ernst et al. |
| D605,931 S | 12/2009 | Piersant |
| D605,932 S | 12/2009 | Piersant |
| D608,620 S | 1/2010 | Morgenroth |
| 7,686,273 B2 | 3/2010 | Christodoulou |
| 7,699,278 B2 | 4/2010 | Goldstein |
| D622,578 S | 8/2010 | Kollman |
| 7,798,463 B2 | 9/2010 | Morgenroth |
| D632,951 S | 2/2011 | McGreevy et al. |
| 7,926,127 B2 | 4/2011 | Barrese |
| D649,025 S * | 11/2011 | Gingery .......................... D8/373 |
| 8,056,873 B1 | 11/2011 | Hanley et al. |
| 8,231,093 B2 | 7/2012 | Tran |
| D668,136 S | 10/2012 | Nicholls et al. |
| D678,754 S | 3/2013 | Burr |
| 8,418,975 B1 | 4/2013 | Burr |
| 8,469,207 B2 | 6/2013 | Rowan et al. |
| 8,500,078 B2 | 8/2013 | Castellanos |
| D700,827 S | 3/2014 | Starck |
| 8,672,286 B2 * | 3/2014 | Darre .......................... A47G 1/164 248/477 |
| 8,678,068 B1 | 3/2014 | Hobart et al. |
| D707,535 S | 6/2014 | Burr |
| 8,740,171 B2 | 6/2014 | Crescenzo |
| 8,814,114 B2 | 8/2014 | Baines |
| 8,827,587 B2 | 9/2014 | Didehvar |
| D714,622 S | 10/2014 | Pan |
| D715,133 S | 10/2014 | Pan |
| D715,625 S | 10/2014 | Pan |
| D715,626 S | 10/2014 | Pan |
| 8,851,435 B1 | 10/2014 | Bastien et al. |
| 8,925,747 B1 | 1/2015 | Hanley |
| 8,960,456 B2 | 2/2015 | Didehvar |
| D742,726 S | 11/2015 | Glass et al. |
| D760,068 S | 6/2016 | Sehl |
| 9,388,837 B1 | 7/2016 | Hanley |
| 9,427,102 B2 | 8/2016 | Weaver |
| D767,378 S | 9/2016 | Sehl |
| 9,609,974 B2 | 4/2017 | Mateer |
| 9,687,092 B2 | 6/2017 | Cabanes |
| D808,779 S | 1/2018 | Shoenhair et al. |
| 10,047,787 B2 | 8/2018 | Cheng |
| 10,123,647 B1 * | 11/2018 | Mustafa .......................... F16B 7/0433 |
| 10,206,526 B1 | 2/2019 | Blakeslee |
| 10,228,080 B2 * | 3/2019 | Zvak .......................... F16L 3/1066 |
| 10,322,690 B2 | 6/2019 | Wang |
| D858,259 S | 9/2019 | Hanley |
| D858,260 S | 9/2019 | Hanley |
| 10,542,835 B1 | 1/2020 | Suozzo |
| 10,624,474 B2 | 4/2020 | Taratuta |
| 10,648,492 B2 | 5/2020 | Hanley |
| 11,092,176 B2 | 8/2021 | Hanley |
| 2002/0162925 A1 | 11/2002 | Song |
| 2005/0000716 A1 | 1/2005 | Halbert |
| 2006/0021722 A1 | 2/2006 | Nien |
| 2006/0054288 A1 | 3/2006 | Bibby et al. |
| 2006/0060314 A1 * | 3/2006 | Battista .......................... A47H 1/102 160/330 |
| 2007/0090244 A1 | 4/2007 | Goldstein |
| 2007/0125923 A1 | 6/2007 | Wong et al. |
| 2007/0186384 A1 | 8/2007 | Broehl et al. |
| 2008/0164393 A1 | 7/2008 | Hung |
| 2008/0210827 A1 | 9/2008 | Samelson |
| 2009/0032659 A1 | 2/2009 | Goldstein |
| 2010/0038329 A1 | 2/2010 | Pan |
| 2010/0059642 A1 | 3/2010 | McLeod |
| 2011/0174948 A1 * | 7/2011 | Ward .......................... A47H 1/142 248/265 |
| 2011/0266404 A1 | 11/2011 | Hsu et al. |
| 2011/0315842 A1 * | 12/2011 | Lin .......................... A47G 25/0635 248/222.14 |
| 2012/0024809 A1 | 2/2012 | Rowan et al. |
| 2012/0067837 A1 | 3/2012 | He et al. |
| 2012/0119046 A1 | 5/2012 | Hsu et al. |
| 2012/0152872 A1 | 6/2012 | Didehvar |
| 2012/0217362 A1 | 8/2012 | Affonso |
| 2012/0228446 A1 | 9/2012 | Mikovich |
| 2012/0261371 A1 | 10/2012 | Baines |
| 2012/0284914 A1 | 11/2012 | Bauer |
| 2013/0043357 A1 | 2/2013 | Mcleod |
| 2013/0082017 A1 | 4/2013 | Tang |
| 2013/0099080 A1 | 4/2013 | Baines |
| 2013/0292349 A1 | 11/2013 | Bucklew et al. |
| 2013/0341474 A1 | 12/2013 | Baines |
| 2014/0103170 A1 * | 4/2014 | Zvak .......................... F16L 3/137 248/74.1 |
| 2014/0150313 A1 | 6/2014 | Stevens |
| 2014/0166603 A1 | 6/2014 | Baines |
| 2014/0231606 A1 * | 8/2014 | Sobb .......................... E04H 17/06 248/224.8 |
| 2014/0306079 A1 | 10/2014 | Kuo |
| 2014/0374367 A1 | 12/2014 | Morel |
| 2015/0265086 A1 | 9/2015 | Hanley et al. |
| 2016/0113428 A1 * | 4/2016 | Weaver .......................... A47H 1/142 248/262 |
| 2016/0242586 A1 | 8/2016 | Mateer |
| 2017/0071390 A1 | 3/2017 | Moss et al. |
| 2017/0079457 A1 | 3/2017 | Baines |
| 2017/0188738 A1 * | 7/2017 | Walker .......................... A47H 1/142 |
| 2017/0332818 A1 | 11/2017 | Jones |
| 2018/0064279 A1 | 3/2018 | Hanley |
| 2018/0098656 A1 | 4/2018 | Baines |
| 2018/0255952 A1 | 9/2018 | Sollers |
| 2018/0317672 A1 | 11/2018 | Taratuta |
| 2019/0374057 A1 | 12/2019 | Keith et al. |

\* cited by examiner

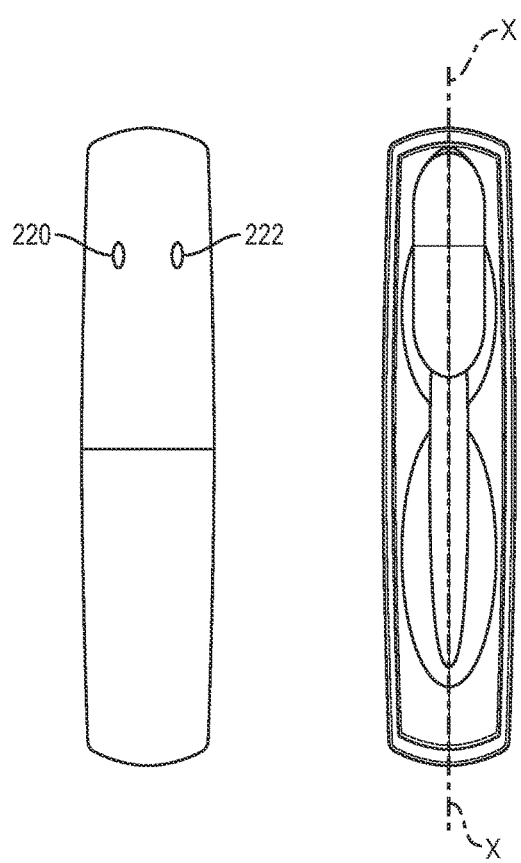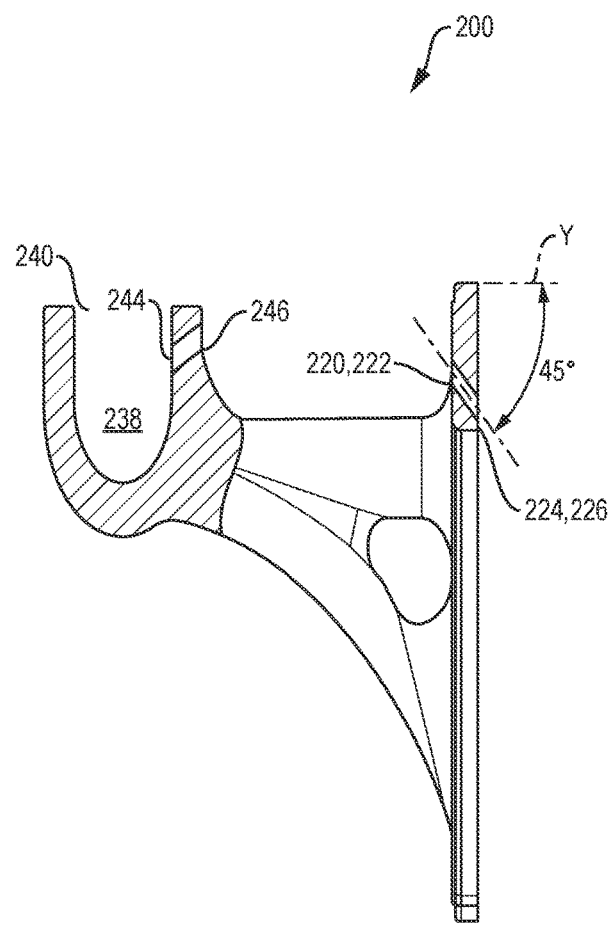
FIG. 6A    FIG. 6B    FIG. 6C

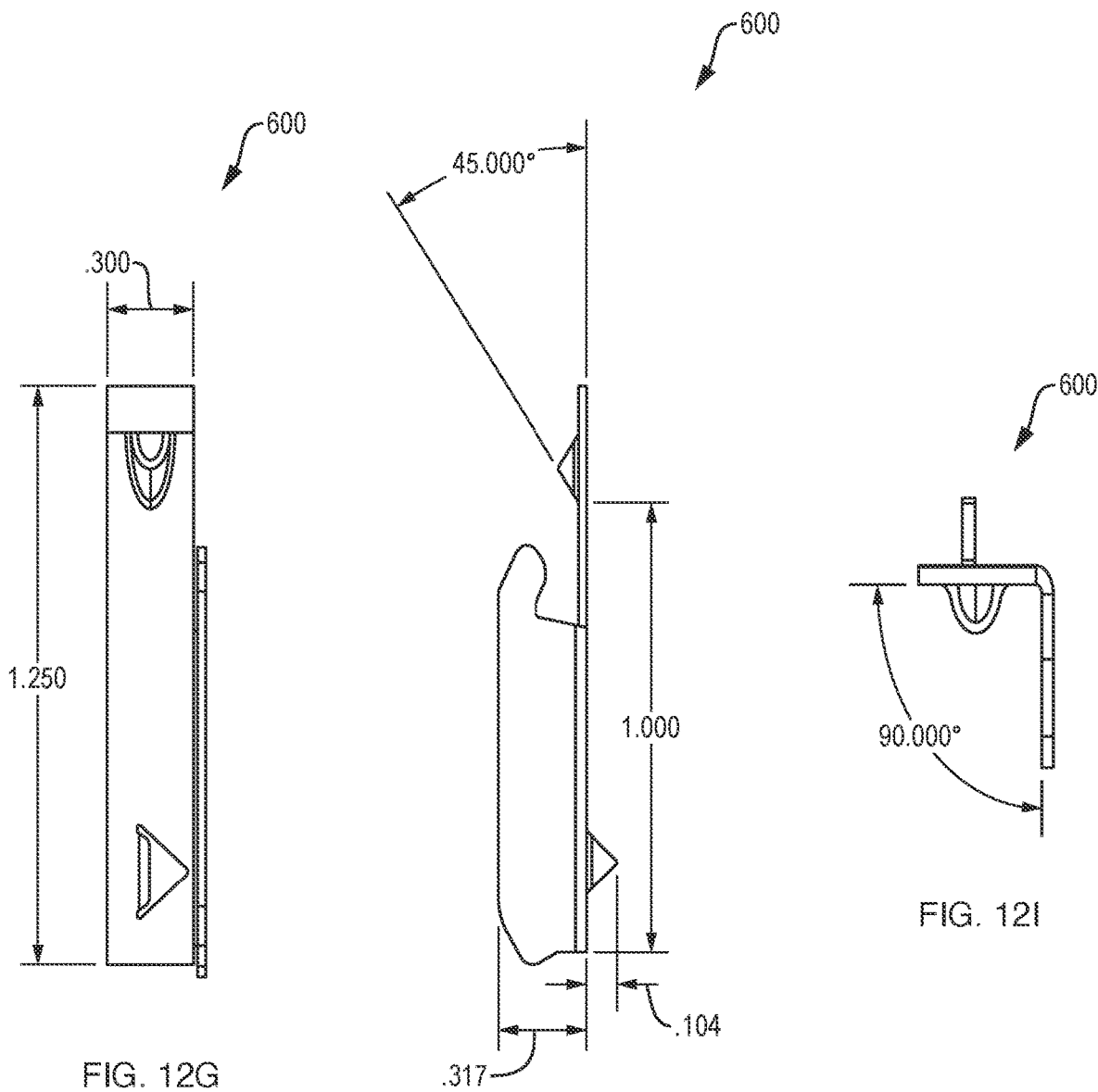

| | |
|---|---|
| BRACKET APPLICATIONS 2202<br>CURTAINS<br>DRAPERY<br>TOWELS<br>SHOWER RODS<br>POTS<br>PANS<br>APPLIANCES<br>HAND TOOLS<br>CLOTHING HOOKS<br>SHELVING | BRACKET KITS 2208<br>DORMITORY<br>APARTMENT<br>NEW CONSTRUCTION<br>BATHROOM<br>KITCHEN<br>LIGHTING<br>SHELVING<br>HEAVY-DUTY<br>BRACKET/ROD/FINIAL | BRACKET FEATURES 2210<br>INTERNAL MOUNT<br>EXTERNAL MOUNT<br>WINDOW FRAME CORNER ALIGNING<br>REUSABLE<br>REMOVABLE<br>NO WALL PREP<br>NO WALL ANCHORS<br>NO SCREWS<br>HAMMER/PUSH IN<br>ROUNDED<br>RECTANGULAR<br>FASTENER FEATURES<br>  RINGED<br>  SERRATED<br>  SELF-TWISTING<br>  CURVED<br>  DECORATIVE HEAD<br>ADJUSTABLE ARM LENGTH<br>ADAPTABLE ROD CRADLE<br>CONCEALED FASTENERS<br>WALL PROTECTING BREAK-AWAY<br>FINIAL MOUNT / INTEGRATION |
| BRACKET ENVIRONMENTS 2204<br>WINDOW COVERING<br>KITCHEN<br>BATH<br>DORMITORY<br>WORKSHOP<br>STOCK SHELVING<br>LIGHTING<br>DECORATIVE HANGINGS<br>ART GALLERIES | BRACKET MATERIAL / PROCESSING 2206<br>CASTING<br>INJECTION MOLDING<br>STAMPING<br>FORMING<br>SHEET STOCK<br>BAR STOCK<br>PLATING<br>PAINTING<br>TWO-PIECE SHROUDED | |

FIG. 22

DORMITORY KIT 2802
TOWEL BAR
TOWEL RING/HOOK
COAT HOOK
SHELF
CADDY HOOK

KITCHEN KIT 2804
POT HANGER
PAN HANGER
DISH TOWEL HOOK
UNDER-CABINET HOOK
APRON HOOK

LIGHTING KIT 2806
WALL SCONCE
SPOT LIGHT
CLOSET LIGHT
FLOOD LIGHT
MOTION DETECTOR

BATH KIT 2808
TOWEL BAR
TOWEL RING/HOOK
SHOWER ROD
SHOWER CURTAIN RINGS
TOILET PAPER DISPENSER
TOOTHBRUSH HOLDER
HAIR DRYER HOOK

WORKSHOP KIT 2810
UTILITY APRON HANGER
SAFETY GOGGLES HOOK
HAMMER HANGER
HAND TOOL HANGER
UTILITY LIGHT HOOK
STORAGE SHELVING

DRAPERY KIT 2812
BRACKET (2), (3)
ROD(S)
ROD-BRACKET ADAPTER
FINIAL

SHELVING KIT 2814
CONCEALED BRACKET
CONCEALED HARDWARE
SHELF BRACKET(S)
SHELVES

OPTIONAL FOR ALL KITS
INSTRUCTIONS
HAMMER
ALIGNMENT TEMPLATE
SPARE NAILS
ADDITIONAL BRACKETS
HEAVY DUTY BRACKETS
BRACKET SHROUD/COVER

FIG. 28

ROD BRACKET

CROSS REFERENCE TO RELATED APPLICATIONS

This application is a continuation-in-part of U.S. patent application Ser. No. 16/358,204 filed Mar. 19, 2019 now published as U.S. Pat. Appl. Publication No. 2019/0282017 which application claims benefit from U.S. Provisional Patent Application Ser. No. 62/644,889, filed Mar. 19, 2018; and a continuation-in-part of U.S. patent application Ser. No. 16/018,979 filed Jun. 26, 2018 now published as of U.S. Pat. Appl. Publication No. 2018/0306219, which is a continuation of U.S. patent application Ser. No. 15/488,781 filed Apr. 17, 2017, which claims priority from U.S. Provisional Patent Application No. 62/384,895 filed Sep. 8, 2016; and the contents all of which are incorporated herein by reference in their entireties.

FIELD OF THE INVENTION

The present invention relates generally to rod brackets and more specifically to a rod bracket for hanging curtains and the like which is configured for easy install.

BACKGROUND OF THE INVENTION

Current curtain rod brackets that are mounted to walls and window casings typically require mounting hardware and preparation of the mounting area before mounting. This usually involves pre-drilling the wall surface and installing screw anchors to provide enough support to support the curtain rod brackets, the curtain rod and the curtains that are associated with the curtain rods. This can be a time consuming and messy process. And in some cases, for the person who is not adept at or who is not used to installing this type of hardware, can damage the wall and/or window casing. One way that has been attempted to overcome this problem is to develop curtain rod brackets that can be installed simply by associating the curtain rod brackets to the wall or window casing via friction and thus, curtain rod bracket that do not require tools to install. Unfortunately however, there are situations where these "tool less" curtain rod brackets cannot be used and thus, must be installed by anchoring the curtain rod bracket to the wall using tools.

In general, curtain rods and such are hung on brackets. In a typical installation, a bracket is placed in a desired position against a wall, the bracket secured to the wall using nails and/or screws, and a curtain rod positioned and suspended securely across the bracket. At a minimum, the installation of the bracket requires a hammer and/or a screwdriver to fixate the nails and/or screws and reasonable manual dexterity to secure the bracket to the wall. More specifically, the bracket is positioned on the wall, nails and/or screws are tap and/or screwed into the wall, and curtain and rod are hung on the bracket. What is needed is a system that eases an installation of a curtain rod bracket to a wall structure.

The drapery hanging industry existed well before the ready availability of consumer feedback that is afforded by the social media and other consumer-direct communication channels made possible by the emergence of Internet. Yet even after the consumer access was available, innovation in the drapery industry generally focused on small changes for manufacturability, advances in related technology and the like. As consumer interest in and contribution to drapery hanging expanded on social media and other consumer information exchange channels, it became apparent that the widespread need for ease of installation of, for example wall mount drapery brackets was not being satisfied by existing and emerging products.

These needs for successful, easy, low-impact and reliable installation extended well beyond mere drapery rod brackets, extending into a wide array of wall-mount hangers, such as towel bars, towel rings, clothing hooks, hooks for kitchen use (e.g., pot hangers), hangers for use in workshops, closets, and the like.

Additionally, consumer input and feedback signaled a widespread need for more complete application-specific solutions that provide comparable ease of successful, low-impact and reliable installation benefits to address wall-hanging needs for kitchens, baths, dormitories, and the like. Such application-specific solutions are desired to not only ease the installation burden, but also ease the shopping and product evaluation burden. At best a consumer had to rely on potential solutions being highlighted by on-line shopping services that suggest, among other things what other consumers viewed and/or bought when a website user viewed or bought, for example a bathroom towel bar.

Yet further, consumer access to analytic capabilities, such as comparison shopping, consumer ratings, awareness of the rapid pace of technological advancement is creating emerging needs for drapery and related wall mount-type brackets and the like to solve multiple needs, from automation to connection through Internet-of-Things concepts to further integrate with home automation capabilities that save energy, increase home owner satisfaction, and promote general quality of health and well-being, among others.

The products, methods, systems and kits described in exemplary embodiments herein and depicted in the accompanying figures set out to address these longstanding, widespread needs.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A rod bracket is provided and includes a bracket base, wherein the bracket base defines a first bracket mounting cavity and a second bracket mounting cavity and includes a bracket front, a bracket rear, a bracket top and a bracket bottom. A bracket arm is also provided, wherein the bracket arm includes a first bracket arm end and a second bracket arm end and wherein the first bracket arm end is securely associated with the bracket front. Furthermore, a curtain rod cradle is provided and is securely associated with the second bracket arm end, wherein the bracket base further includes a first bracket side and a second bracket side and wherein the first bracket mounting cavity is located on the first bracket side and the second bracket mounting cavity is located on the second bracket side and wherein the first bracket mounting cavity and second bracket mounting cavity are configured at an angle between about 30° and about 60° relative to a horizontal plane.

A rod bracket is provided and includes a bracket base, wherein the bracket base defines a plurality of bracket mounting cavities and includes a bracket front, a bracket rear, a bracket top and a bracket bottom.

Additionally, a bracket arm and a curtain rod cradle securely associated with the bracket base via the bracket arm is also included, wherein the plurality of bracket mounting cavities communicate the bracket front with the bracket rear and are configured at an angle of about 45° relative to a horizontal plane.

A rod bracket is provided and includes a bracket base, wherein the bracket base defines a plurality of bracket mounting cavities and includes a base front, a base rear, a base top and a base bottom, a bracket arm having a bracket arm length and a curtain rod cradle securely associated with the bracket base via the bracket arm, wherein the plurality of bracket mounting cavities communicate the base front with the base rear and are configured at an angle of between about 30° and 60° relative to a horizontal plane, and wherein the bracket base defines a first bracket base rear opening, and wherein the ratio between the bracket arm length and the distance between the first bracket base rear opening and the base bottom is about 1:1.

In general, in one aspect, the invention features a system including a bracket, the bracket comprising a back plate, an arm and a curtain rod cradle, and a fastening plate, a rear of the back plate configured to slidably receive the fastening plate. In another aspect, the invention features a system including a bracket, the bracket comprising a back plate, an arm and a curtain rod cradle, and a fastening prong, fastening prong comprising a flat portion linked to a penetration portion, a rear of the back plate configured to slidably receive the flat portion.

In still another aspect, the invention features a method including providing a bracket system having a bracket and a prong, sliding a back of the bracket over an exposed portion of the prong, and manually pressing the bracket into a wall at a desired location without the use of additional tools, securing the bracket to the wall with a pointed end of the prong.

The invention may have one or more of the following advantages. The installation of a curtain rod bracket is accomplished by placing bracket having a fastening prong at a desired location, manually pressing it into a wall without accessory tools. The installation of a curtain rod bracket is effectuated without a need for tools.

A bracket and a prong are assembled prior to installation by sliding a flat portion of the prong into a channel on the back of the bracket. A customer then uses the bracket as leverage in securing the bracket to a wall with a pointed end of the prong. This makes installation easier.

Consumer needs present in the drapery hanging industry include ease of installation with high reliability and low impact are addressed through a range of products, product features, product mix (e.g., kits and the like), integration of technology and the like. These solutions embodied herein benefit a range of consumer and industrial markets that meet needs for wall mounted brackets for draperies, soft privacy coverings for windows and doors, shelving, decluttering (e.g., hanging pots, pans, hand-held appliances, tools, and the like), cleanliness (e.g., hand, bath, and kitchen towels), lighting, art/sports memorabilia display, and the like. These and other systems, methods, objects, features, and advantages of the present disclosure will be apparent to those skilled in the art from the following detailed description of the preferred embodiment and the drawings. These and other features and advantages will be apparent from a reading of the following detailed description and a review of the associated drawings. It is to be understood that both the foregoing general description and the following detailed description are explanatory only and are not restrictive of aspects as claimed.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike:

FIGS. 2A, 2B and 2C are front and side sectional views of the rod bracket of FIG. 1.

FIGS. 6A, 6B and 6C are front and side sectional views of the rod bracket of FIG. 5.

FIG. 12G shows a front view of one embodiment of the rod bracket of FIG. 12A.

FIG. 12H shows a side view of the embodiment of the rod bracket of FIG. 12G.

FIG. 12I shows a top down view of the embodiment of the rod bracket of FIG. 12G.

FIG. 22 depicts non-limiting exemplary embodiments of anchorless-installed wall-mount bracket applications, environments, kits, materials, processes, and features.

FIG. 28 depicts exemplary, non-limiting embodiments of kits that may be based on an anchorless-installed wall-mount bracket.

DETAILED DESCRIPTION OF THE INVENTION

Figure 1:
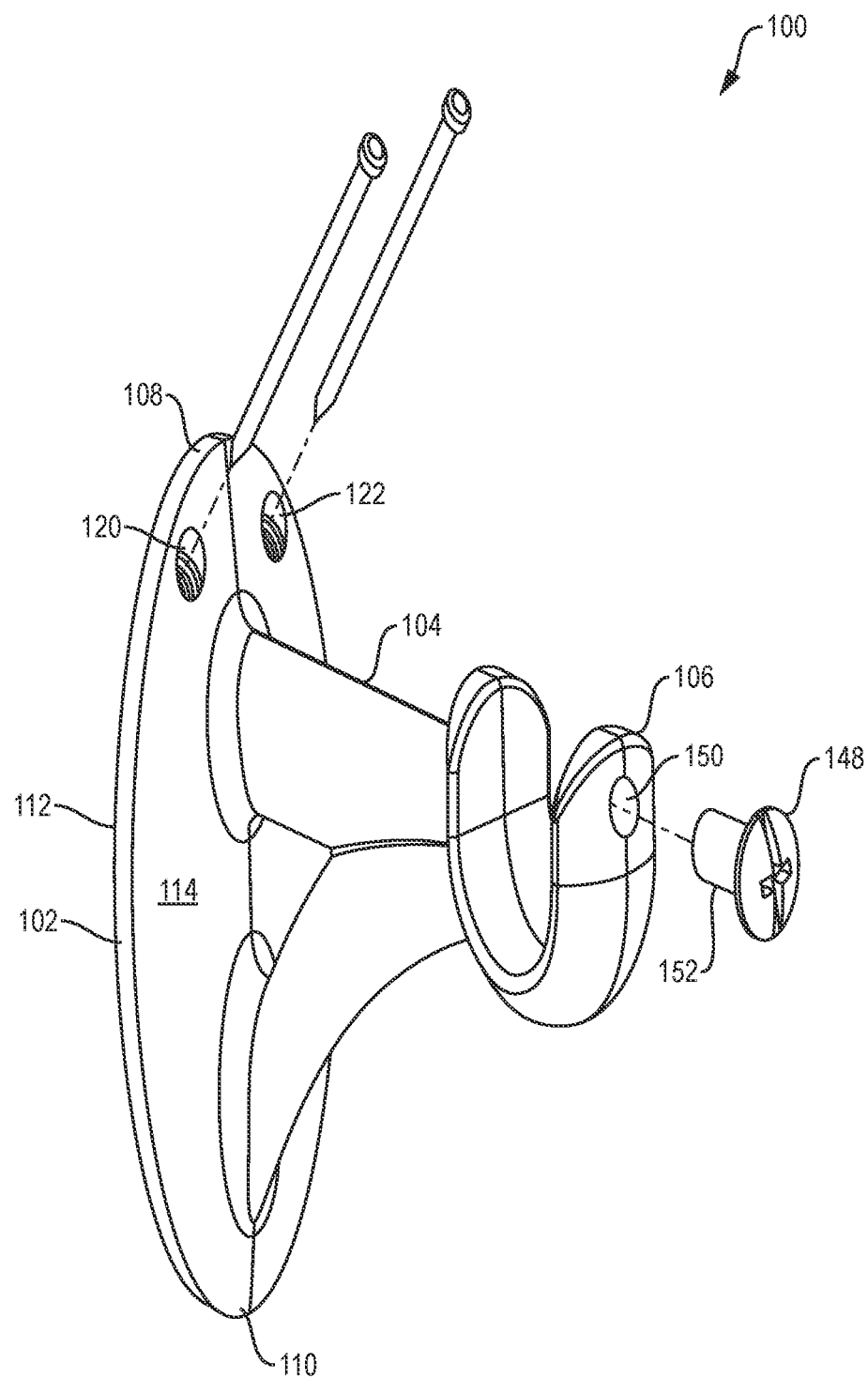
FIG. 1 is a side perspective view of a rod bracket, in accordance with one embodiment of the invention.
Figure 2A:
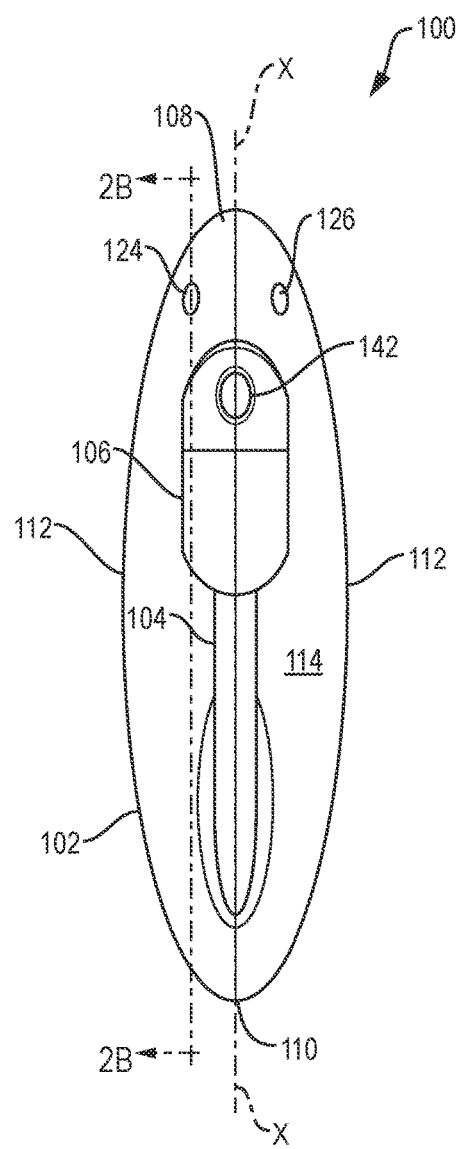
Figure 2B:
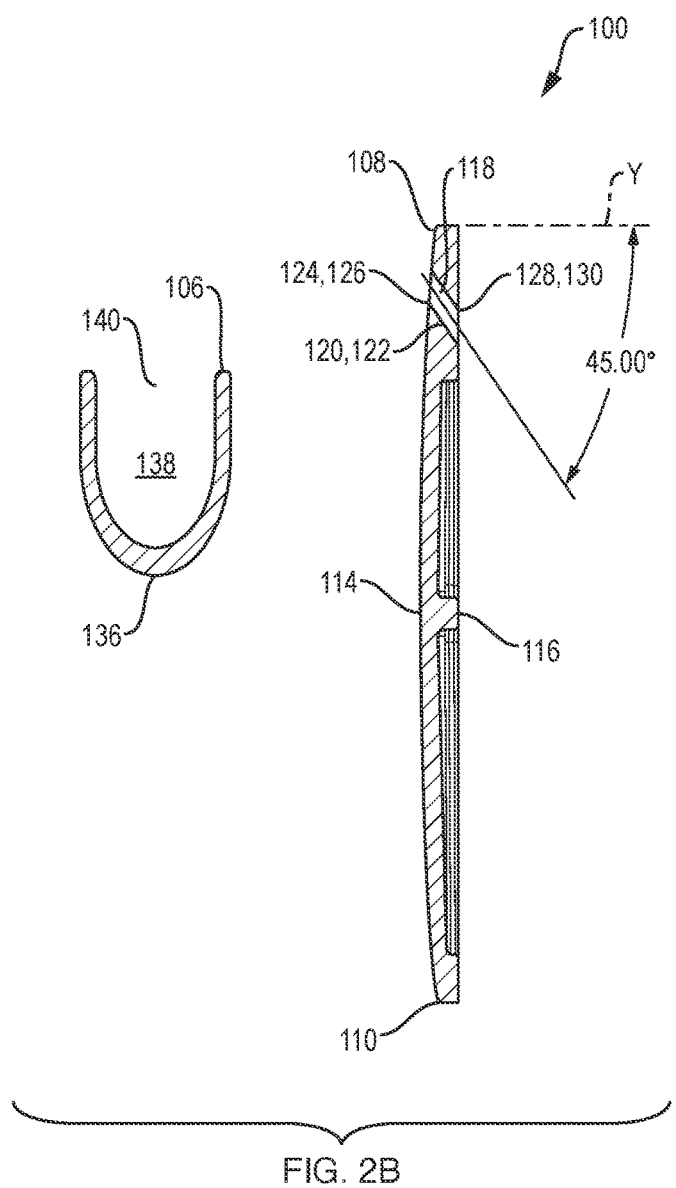
Figure 3:
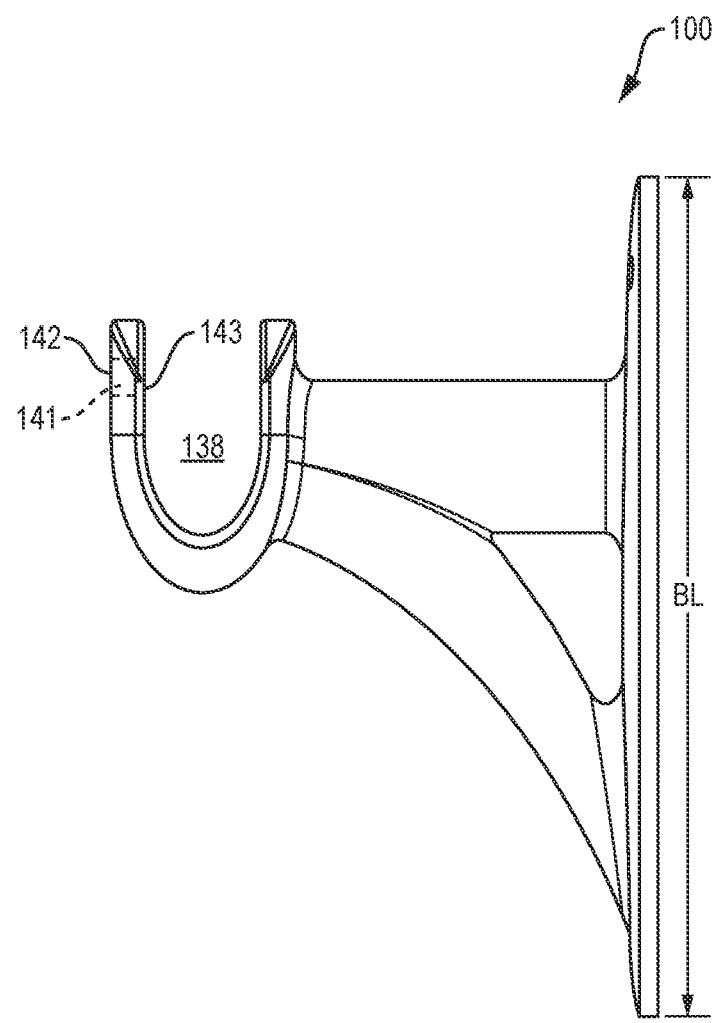
FIG. 3 is a side view of the rod bracket of FIG. 1.
Figure 4:
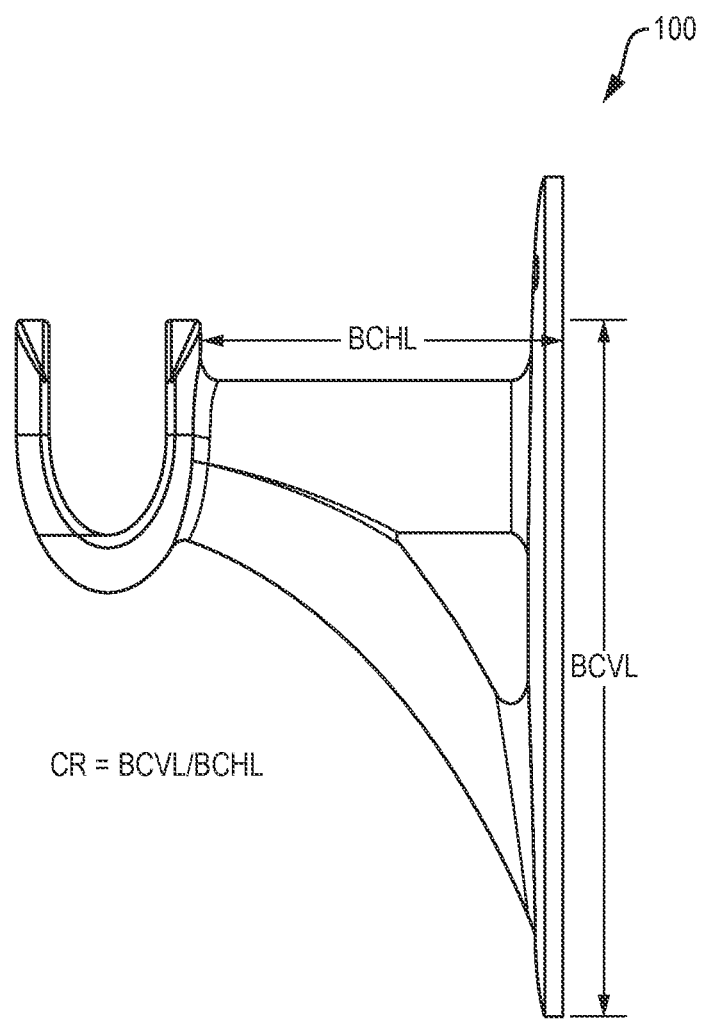
FIG. 4 is a side of the rod bracket of FIG. 1.
Figure 5:
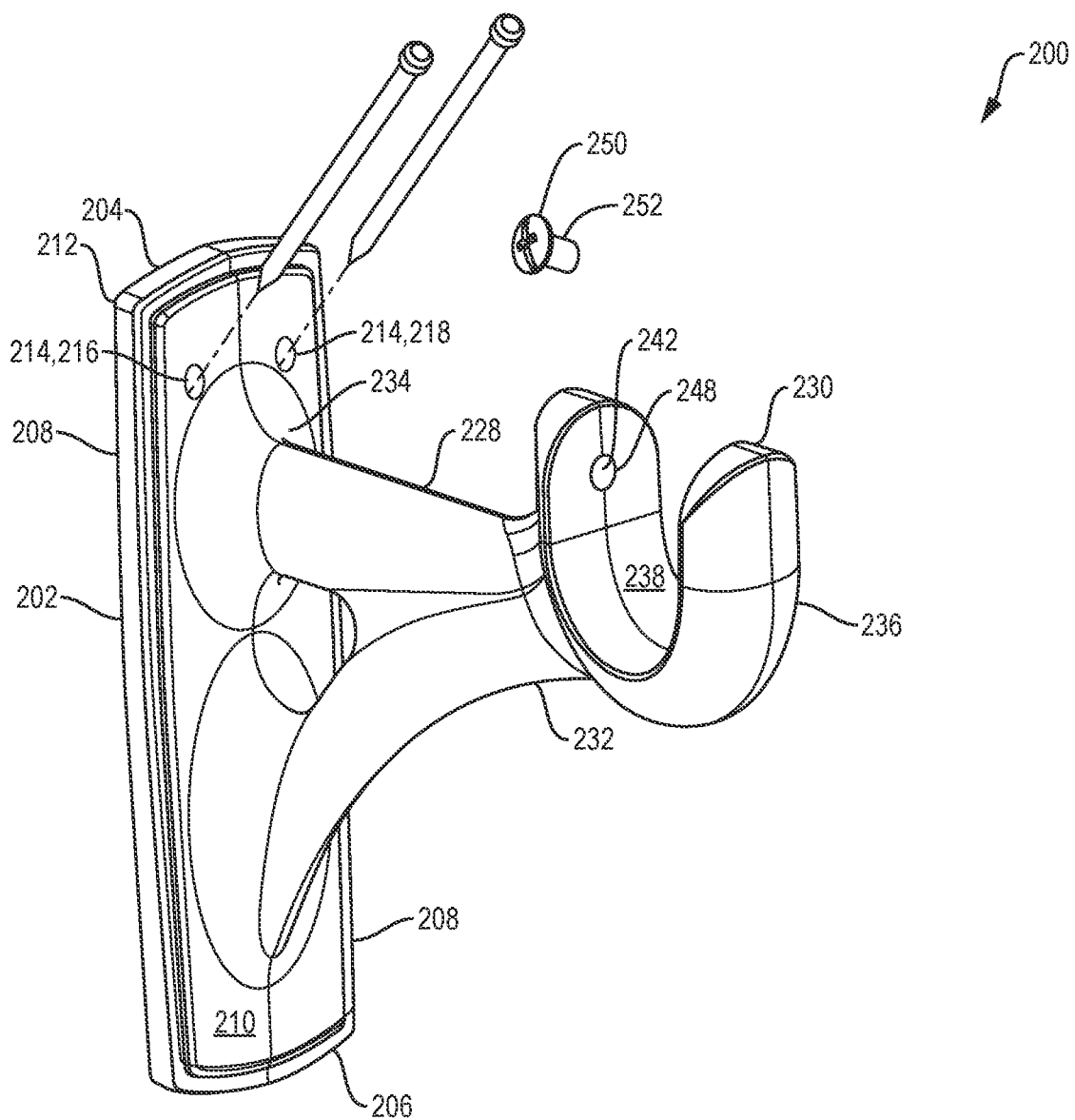
FIG. 5 is a side perspective view of a rod bracket, in accordance with another embodiment of the invention.
Figures 7A, 7B, 7C, 7D:
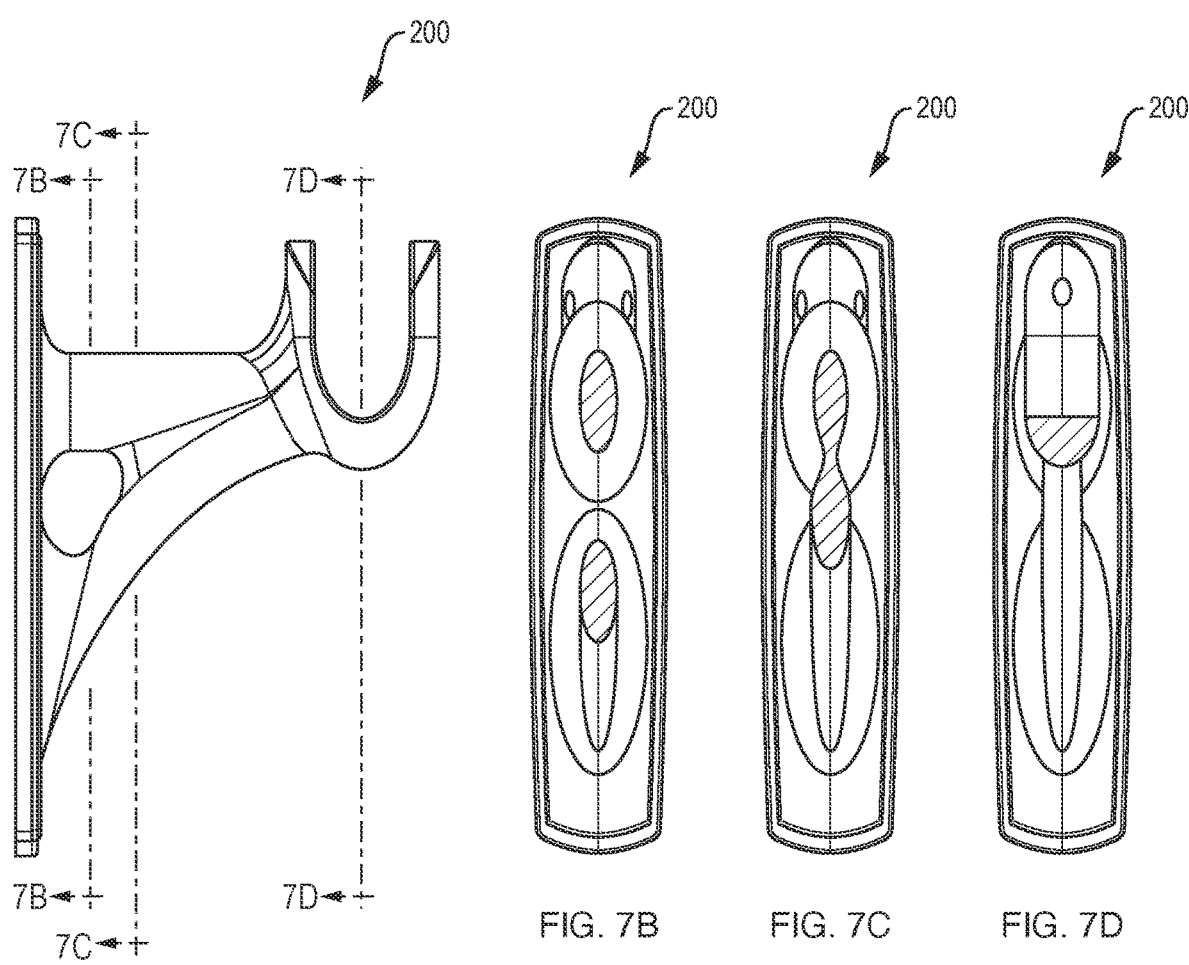
FIGS. 7A, 7B, 7C and 7D are front and side sectional views of the rod bracket of FIG. 5.
Figure 8:
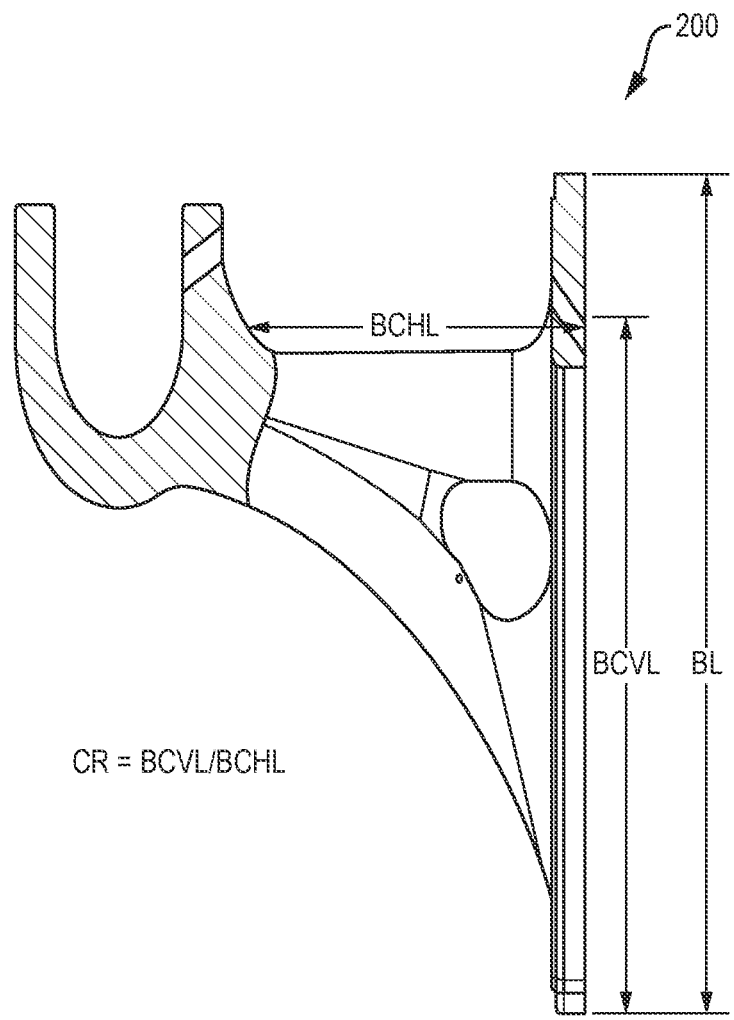
FIG. 8 is a side of the rod bracket of FIG. 5.

Referring to the FIG. 1, FIG. 2A, FIG. 2B, FIG. 2C and FIG. 3, one embodiment of a rod bracket 100 is provided and includes a bracket base 102, a bracket rod arm 104 and a curtain rod cradle 106, wherein the bracket base 102 is substantially oval or elliptical in shape and includes a base top 108, a base bottom 110, base sides 112, a base front 114 and a base rear 116. The bracket base 102 defines a plurality of base mount cavities 118 located proximate the base top 108, wherein the plurality of base mount cavities 118 includes a first base mount cavity 120 and a second base mount cavity 122. It should be appreciated that the first base mount cavity 120 and second base mount cavity 122 are located such that if an imaginary axis line X were drawn through the center of the bracket base 102 from the base top 108 to the base bottom 110, the first base mount cavity 120 is located on one side of the imaginary axis line X and the second base mount cavity 122 is located equidistance on the other side of the imaginary axis line X. Unlike the base top 108, the base bottom 110 does not have any apertures and/or cavities proximate thereto.

The bracket base 102 defines a first bracket base front opening 124, a second bracket base front opening 126, a first bracket base rear opening 128 and a second bracket base rear opening 130, wherein the first bracket base front opening 124 is communicated with the first bracket base rear opening 128 via the first base mount cavity 120 and wherein the second bracket base front opening 126 is communicated with the second bracket base rear opening 130 via the second base mount cavity 122. It should be appreciated that the first base mount cavity 120 and second base mount cavity 122 are configured to traverse the width of the bracket base 102 at an angle of about 45° relative to a horizontal plane Y. It should be appreciated that the bracket base 102 includes a base length BL which extends between the base top 108 and the base bottom 110. Additionally, the bracket base 102 includes a bracket clearance vertical length BCVL which extends from the first bracket base rear opening 128 and second bracket base rear opening 130 to the base bottom 110.

The bracket rod arm 104 includes an arm cradle end 132 and an arm base end 134 and is securely connected to (or integral with) the bracket base 102, wherein the bracket rod arm 104 is configured to extend out of and away from the base front 114. The bracket rod arm 104 also includes a bracket clearance horizontal length BCHL which extends between the arm cradle end 132 and the base rear 116. It is contemplated that in one embodiment there is a one-to-one (1:1) clearance ratio CR between the bracket clearance horizontal length BCHL and the bracket clearance vertical length BCVL. It should be appreciated that the clearance ratio CR may be increased by increasing the bracket clearance vertical length BCVL. This would advantageously allow for the rod bracket to support heavier loads than the 1:1 clearance ratio CR.

The curtain rod cradle 106 includes a cradle structure 136 which defines a rod cavity 138 and a cradle opening 140, wherein the cradle opening 140 is communicated with the rod cavity 138 and wherein the rod cavity is sized and shape to at least partially contain a curtain rod. The curtain rod cradle 106 is securely attached (or integral with) to the arm cradle end 132 of the bracket rod arm 104. The cradle structure 136 further defines a cradle mounting cavity 142 having a cradle mounting cavity first opening 141 and a cradle mounting cavity second opening 143, wherein the cradle mounting cavity first opening 141 is communicated with the cradle mounting cavity second opening 143 via the cradle mounting cavity 142. It should be appreciated that the cradle mounting cavity second opening 143 is located so as to be within the rod cavity 138. Additionally, the cradle mounting cavity 142 includes a threaded cavity surface 150 such that when a rod mounting screw 148 having a threaded screw surface 152 is inserted into the cradle mounting cavity first opening and rotated, the threaded screw surface 152 and the threaded cavity surface 150 engage each other. As such, the rod mounting screw 148 is securely contained within the cradle mounting cavity 142 such that a portion of the rod mounting screw 148 is protruding from the cradle mounting cavity second opening.

It should be appreciated that the bracket base 102 may be configured to have different shapes as desired, such as, for example, rectangular, triangular and square. Referring to FIG. 5, FIGS. 6A, 6B, 6C and FIGS. 7A, 7B, 7C and 7D, another embodiment of a rod bracket 200 is provided and includes a bracket base 202 that is rectangular in shape. The bracket base 202 includes a base top 204, a base bottom 206, base sides 208, a base front 210 and a base rear 212. The bracket base 202 defines a plurality of base mount cavities 214 located proximate the base top 204, wherein the plurality of base mount cavities 214 includes a first base mount cavity 216 and a second base mount cavity 218. It should be appreciated that the first base mount cavity 216 and second base mount cavity 218 are located such that if an imaginary axis line X were drawn through the center of the bracket base 202 from the base top 204 to the base bottom 206, the first base mount cavity 216 is located on one side of the imaginary axis line X and the second base mount cavity 218 is located equidistance on the other side of the imaginary axis line X.

The bracket base 202 defines a first bracket base front opening 220, a second bracket base front opening 222, a first bracket base rear opening 224 and a second bracket base rear opening 226, wherein the first bracket base front opening 220 is communicated with the first bracket base rear opening 224 via the first base mount cavity 216 and wherein the second bracket base front opening 222 is communicated with the second bracket base rear opening 226 via the second base mount cavity 218. It should be appreciated that the first base mount cavity 216 and second base mount cavity 218 are configured to traverse the width of the bracket base 202 at an angle of about 45° relative to a horizontal plane Y. It should be appreciated that the bracket base 202 includes a base length BL which extends between the base top 204 and the base bottom 206. Additionally, the bracket base 202 includes a bracket clearance vertical length BCVL which extends from the first bracket base rear opening 224 and second bracket base rear opening 226 to the base bottom 206.

The rod bracket 200 further includes a bracket rod arm 228 and a curtain rod cradle 230, wherein the bracket rod arm 228 includes an arm cradle end 232 and an arm base end 234 and is securely connected to (or integral with) the bracket base 202. The bracket rod arm 228 is configured to extend out of and away from the base front 210. The bracket rod arm 228 also includes a bracket clearance horizontal length BCHL which extends between the arm cradle end 232 and the base rear 212. It is contemplated that in one embodiment there is a one-to-one (1:1) clearance ratio CR between the bracket clearance horizontal length BCHL and the bracket clearance vertical length BCVL. It should be appreciated that the clearance ratio CR may be increased by increasing the bracket clearance vertical length BCVL. This would advantageously allow for the rod bracket to support heavier loads than the 1:1 clearance ratio CR.

The curtain rod cradle 230 includes a cradle structure 236 which defines a rod cavity 238 and a cradle opening 240, wherein the cradle opening 240 is communicated with the rod cavity 238 and wherein the rod cavity 238 is sized and shape to at least partially contain a curtain rod. The curtain rod cradle 230 is securely attached to (or integral with) the arm cradle end 232 of the bracket rod arm 228. The cradle structure 236 further defines a cradle mounting cavity 242 having a cradle mounting cavity first opening 244 and a cradle mounting cavity second opening 246, wherein the cradle mounting cavity first opening 244 is communicated with the cradle mounting cavity second opening 246 via the cradle mounting cavity 242. It should be appreciated that the cradle mounting cavity second opening 246 is located so as to be within the rod cavity 238. Additionally, the cradle mounting cavity 242 includes a threaded cavity surface 248 such that when a rod mounting screw 250 having a threaded screw surface 252 is inserted into the cradle mounting cavity first opening 244 and rotated, the threaded screw surface 252 and the threaded cavity surface 248 engage each other. As such, the rod mounting screw 250 is securely contained within the cradle mounting cavity 242 such that a portion of the rod mounting screw 250 is protruding from the cradle mounting cavity second opening 246.

Figure 9A:
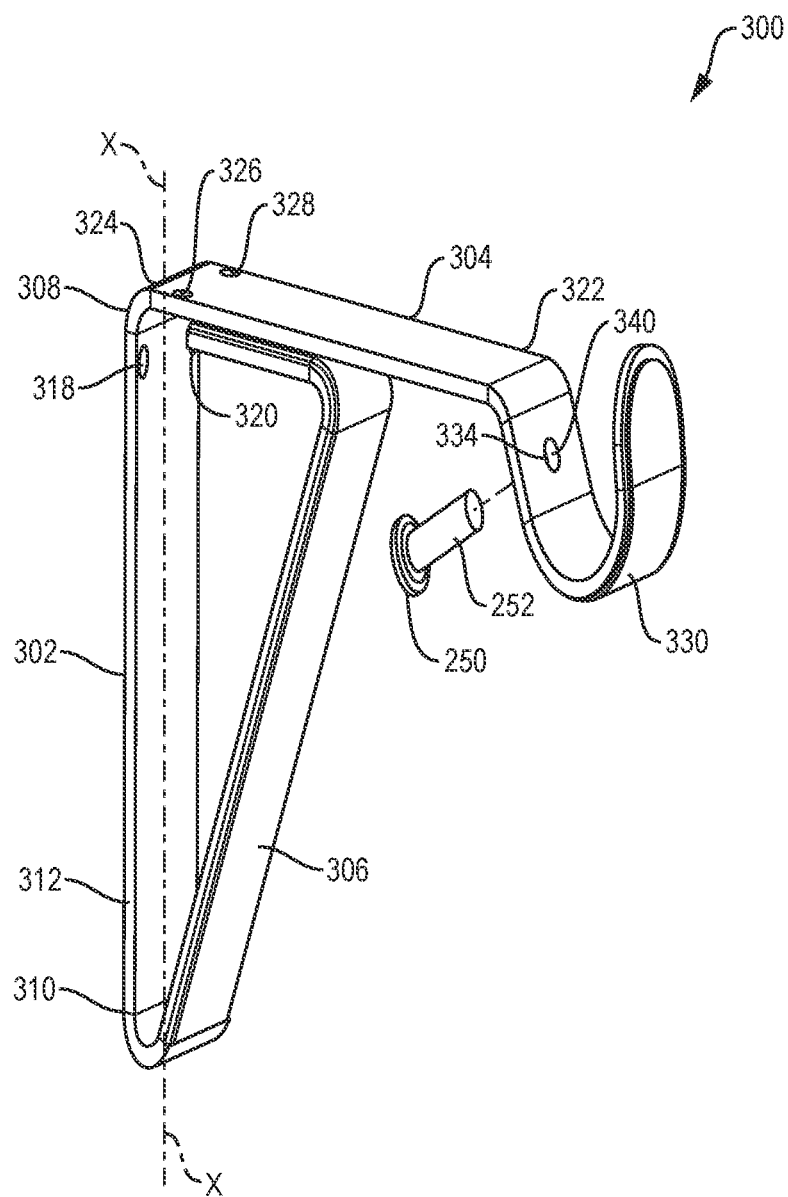
FIG. 9A is a front view of a rod bracket, in accordance with still yet another embodiment of the invention.
Figure 9B:
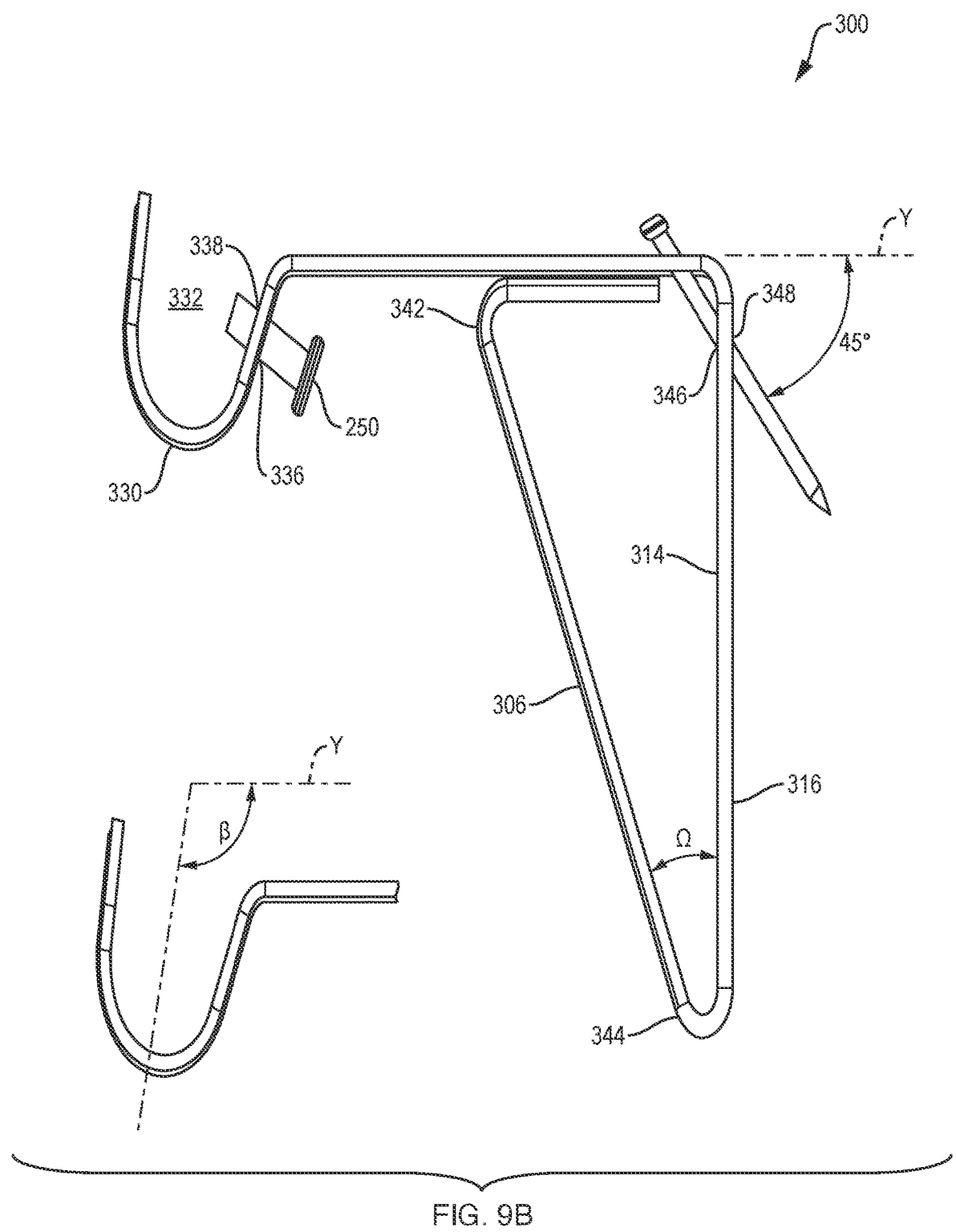
FIG. 9B is a side view of the rod bracket of FIG. 9A.
Figure 9C:
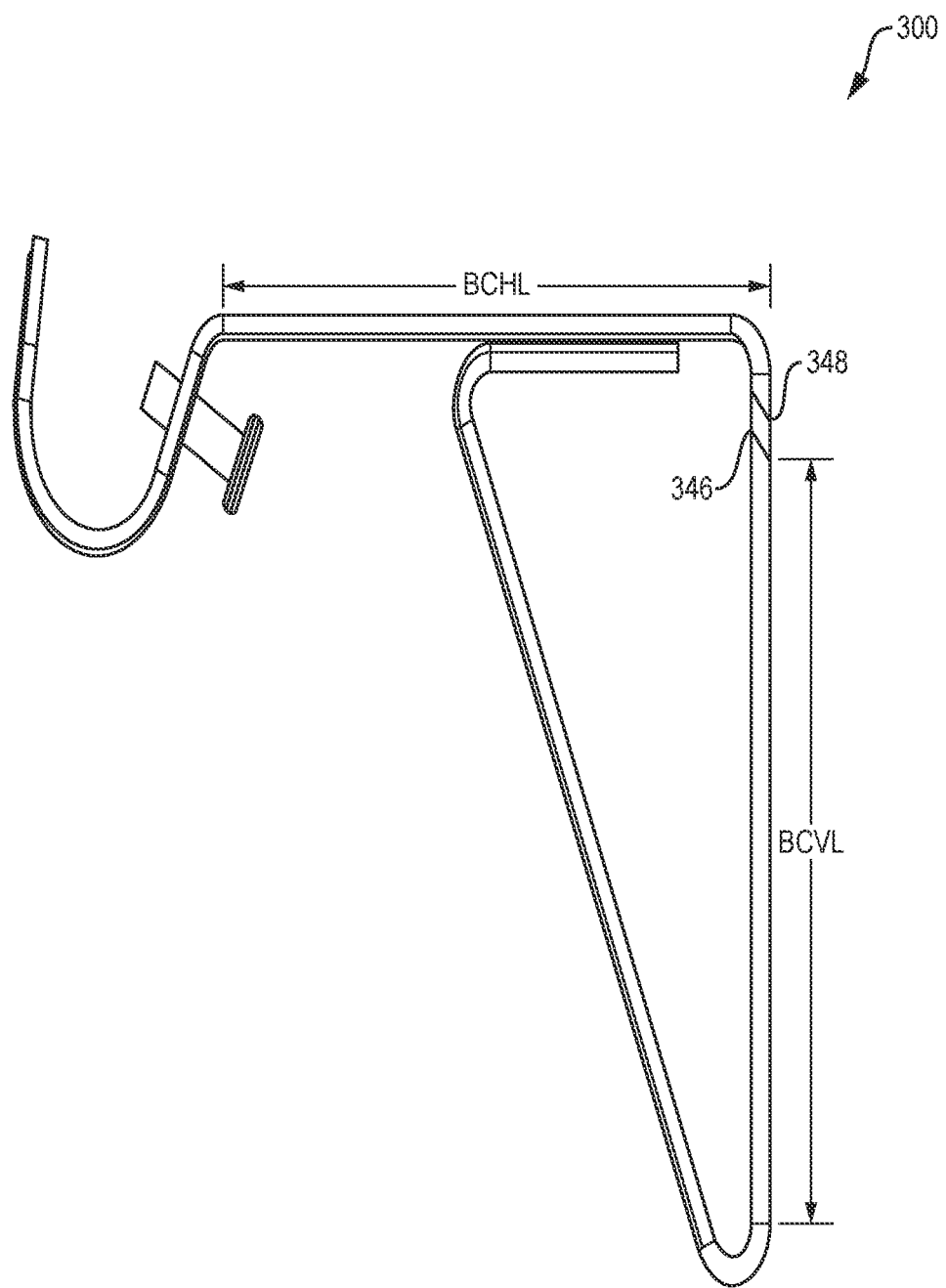
FIG. 9C is a side view of the rod bracket of FIG. 9A.

Referring to FIG. 9A, FIG. 9B and FIG. 9C, another embodiment of a rod bracket 300 is shown and includes a bracket base 302, a bracket rod arm 304 and a bracket support arm 306. The bracket base 302 includes a base top 308, a base bottom 310, base sides 312, a base front 314 and a base rear 316. The bracket base 302 defines a first base mount cavity 318 and a second base mount cavity 320 located proximate the base top 308. The first base mount cavity 318 and the second base mount cavity 320 are located such that if an imaginary axis line X were drawn down the center of the bracket base 302 from the base top 308 to the base bottom 310, the first base mount cavity 318 is located on one side of the imaginary axis line X and the second base mount cavity 320 is located equidistance on the other side of the imaginary axis line X.

The bracket rod arm 304 includes an arm cradle end 322, an arm base end 324, a first rod arm cavity 326 and a second rod arm cavity 328, wherein the first rod arm cavity 326 and second rod arm cavity 328 are located proximate the arm base end 324. It should be appreciated that the first base mount cavity 318 is aligned with the first rod arm cavity 326 such that when the bracket base 302 is placed against a surface and a nail or screw is passed through the first base mount cavity 318 and the first rod arm cavity 326, the nail or screw will enter the surface at an angle of about 45° relative to a horizontal plane Y. It should be appreciated that the rod bracket 300 includes a curtain rod cradle 330 located proximate the arm cradle end 322, wherein the curtain rod cradle 330 defines a rod cavity 332 and a cradle mounting cavity 334 having a cradle mounting cavity first opening 336 and a cradle mounting cavity second opening 338, wherein the cradle mounting cavity first opening 336 is communicated with the cradle mounting cavity second opening 338 via the cradle mounting cavity 334.

It should also be appreciated that the cradle mounting cavity second opening 338 is located so as to be within the rod cavity 332. Additionally, the cradle mounting cavity 334 includes a threaded cavity surface 340 such that when a rod mounting screw 250 having a threaded screw surface 252 is inserted into the cradle mounting cavity first opening 336 and rotated, the threaded screw surface 252 and the threaded cavity surface 340 engage each other. As such, the rod mounting screw 250 is securely contained within the cradle mounting cavity 334 such that a portion of the rod mounting screw 250 is protruding from the cradle mounting cavity second opening 338. It should be appreciated that the curtain rod cradle 330 may be angled at an angle 13 relative a horizontal plane Y, wherein 13 may range from about 90° to about 135°.

Furthermore, the bracket support arm 306 includes a support arm top 342 and a support arm bottom 344, wherein the support arm top 342 is associated with the bracket rod arm 304 and the support arm bottom 344 is connected to the base bottom 310 such that the bracket support arm 306 is angled at an angle SL relative to the bracket base 302, wherein SL may range from about 10° to about 45°. It should be appreciated that the support arm top 342 may be connected to the bracket rod arm 304 or the support arm top 342 may be associated with the bracket rod arm 304 such that a portion of the bracket rod arm 304 rest upon and may be partially supported by the bracket support arm 306 when a rod is located within the rod cavity 332.

Referring to FIG. 9C, It should be appreciated that the first and second base mounting cavities 318, 320 include a front opening 346 located on the base front 314 and a rear opening 348 located on the base rear 316. Also, the bracket base 302 includes a bracket clearance vertical length BCVL which extends from the rear opening 348 to the base bottom 310 and the bracket rod arm 304 includes a bracket clearance horizontal length BCHL which extends between the arm cradle end 324 and the base rear 316. It is contemplated that in one embodiment there is a one-to-one (1:1) clearance ratio CR between the bracket clearance horizontal length BCHL and the bracket clearance vertical length BCVL and in other embodiments the CR may be greater or lesser than a one-to-one (1:1) ratio. It should be appreciated that the clearance ratio CR may be increased by increasing the bracket clearance vertical length BCVL which would advantageously allow for the rod bracket to support heavier loads than the 1:1 clearance ratio CR.

Figure 10A:
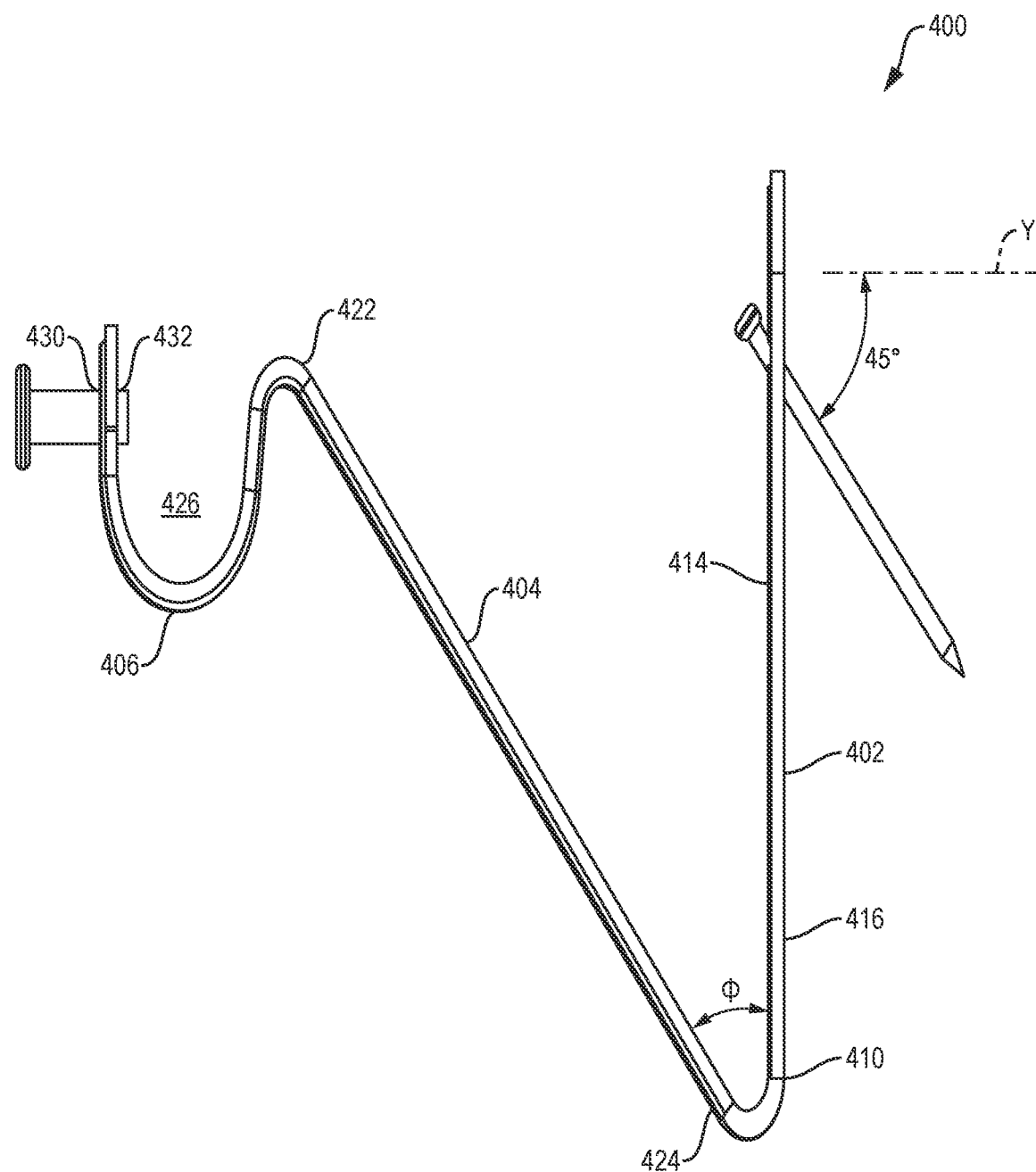
FIG. 10A is a side view of a rod bracket, in accordance with still yet another embodiment of the invention.
Figure 10B:
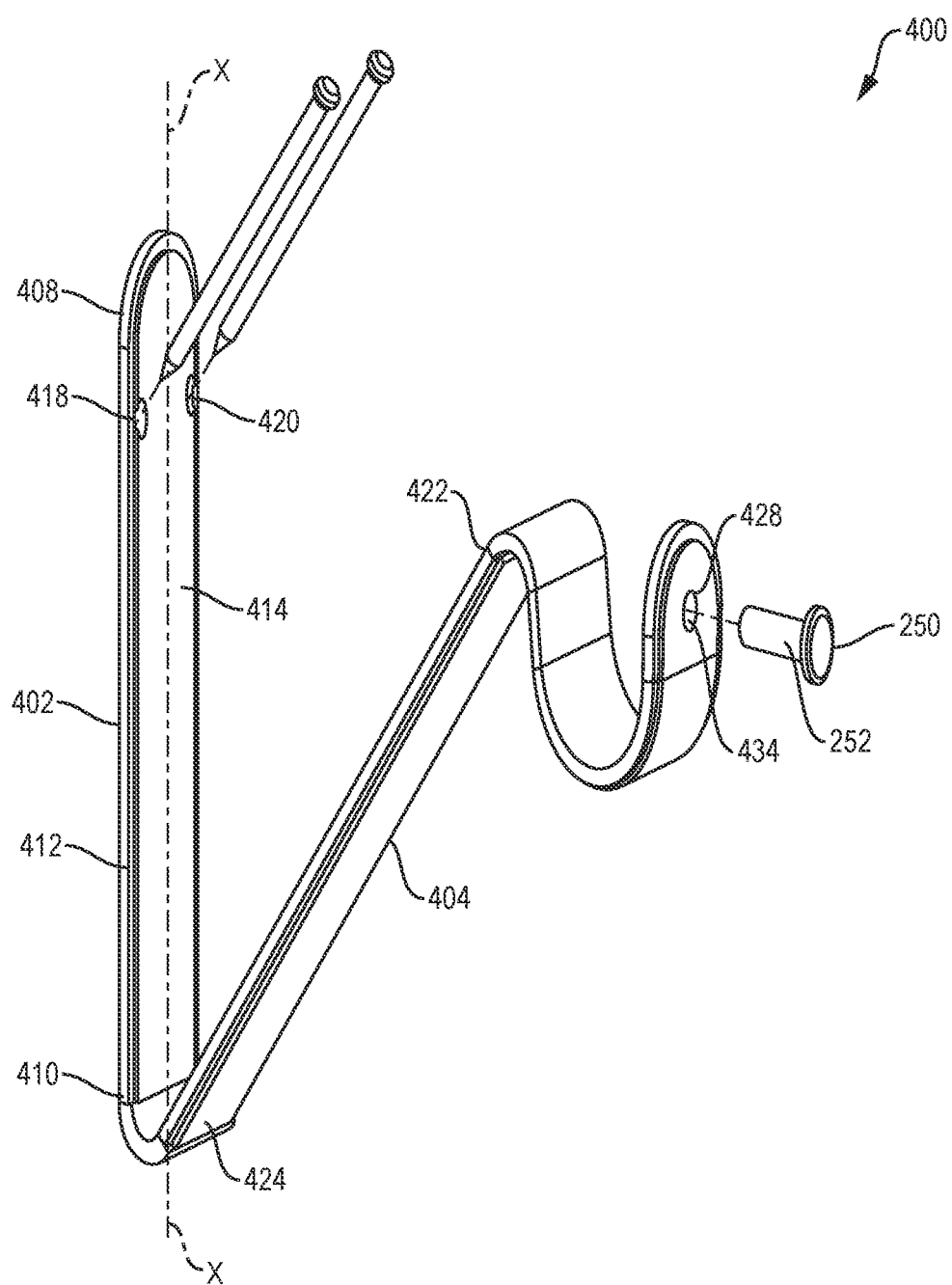
FIG. 10B is a front side view of the rod bracket of FIG. 10A.
Figure 10C:
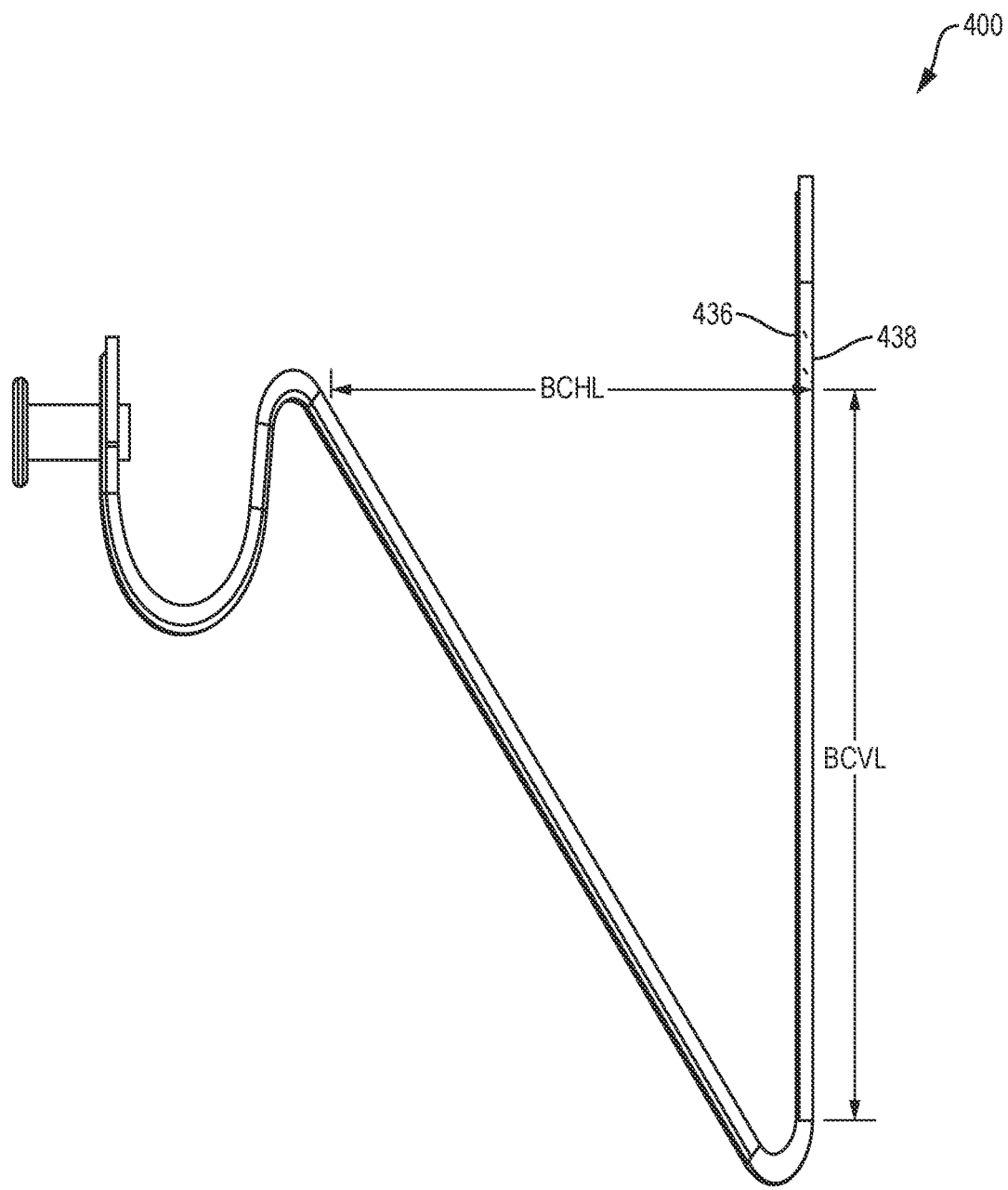
FIG. 10C is a side view of the rod bracket of FIG. 10A.

Referring to FIG. 10A, FIG. 10B and FIG. 10C, another embodiment of a rod bracket 400 is shown and includes a bracket base 402, a bracket rod arm 404 and a curtain rod cradle 406. The bracket base 402 includes a base top 408, a base bottom 410, base sides 412, a base front 414 and a base rear 416. The bracket base 402 defines a first base mount cavity 418 and a second base mount cavity 420 located proximate the base top 408. The first base mount cavity 418 and the second base mount cavity 420 are located such that if an imaginary axis line X were drawn down the center of the bracket base 402 from the base top 408 to the base bottom 410, the first base mount cavity 418 is located on one side of the imaginary axis line X and the second base mount cavity 420 is located equidistance on the other side of the imaginary axis line X. Moreover, it should be appreciated that the first base mount cavity 418 and second base mount cavity 420 are configured such that when the bracket base 402 is placed against a surface and a nail or screw is passed through the first base mount cavity 418 and the second base mount cavity 420, the nail or screw will enter the surface at an angle of about 45° relative to a horizontal plane Y.

The bracket rod arm 404 includes an arm cradle end 422 and an arm base end 424, wherein arm cradle end 422 is connected to the curtain rod cradle 406 and wherein the arm base end 424 is connected to the base bottom 410 such that the bracket rod arm 404 is angled at an angle F relative to the bracket base 402, wherein F may range from about 15° to about 60°. It should be appreciated that the curtain rod cradle 406 defines a rod cavity 426 and a cradle mounting cavity 428 having a cradle mounting cavity first opening 430 and a cradle mounting cavity second opening 432, wherein the cradle mounting cavity first opening 430 is communicated with the cradle mounting cavity second opening 432 via the cradle mounting cavity 428.

It should also be appreciated that the cradle mounting cavity second opening 432 is located to be within the rod cavity 426. Additionally, the cradle mounting cavity 428 includes a threaded cavity surface 434 such that when a rod mounting screw 250 having a threaded screw surface 252 is inserted into the cradle mounting cavity first opening 430 and rotated, the threaded screw surface 252 and the threaded cavity surface 434 engage each other. As such, the rod mounting screw 250 is securely contained within the cradle mounting cavity 428 such that a portion of the rod mounting screw 250 is protruding from the cradle mounting cavity second opening 432.

Referring to FIG. 10C, It should be appreciated that the first and second base mounting cavities 418, 420 include a front opening 436 located on the base front 414 and a rear opening 438 located on the base rear 416. Also, the bracket base 402 includes a bracket clearance vertical length BCVL which extends from the rear opening 438 to the base bottom 410 and the bracket rod arm 404 includes a bracket clearance horizontal length BCHL which extends between the arm cradle end 422 and the base rear 416. It is contemplated that in one embodiment there is a one-to-one (1:1) clearance ratio CR between the bracket clearance horizontal length BCHL and the bracket clearance vertical length BCVL and in other embodiments the CR may be greater or lesser than a one-to-one (1:1) ratio. It should be appreciated that the clearance ratio CR may be increased by increasing the bracket clearance vertical length BCVL which would advantageously allow for the rod bracket to support heavier loads than the 1:1 clearance ratio CR.

Figure 11:
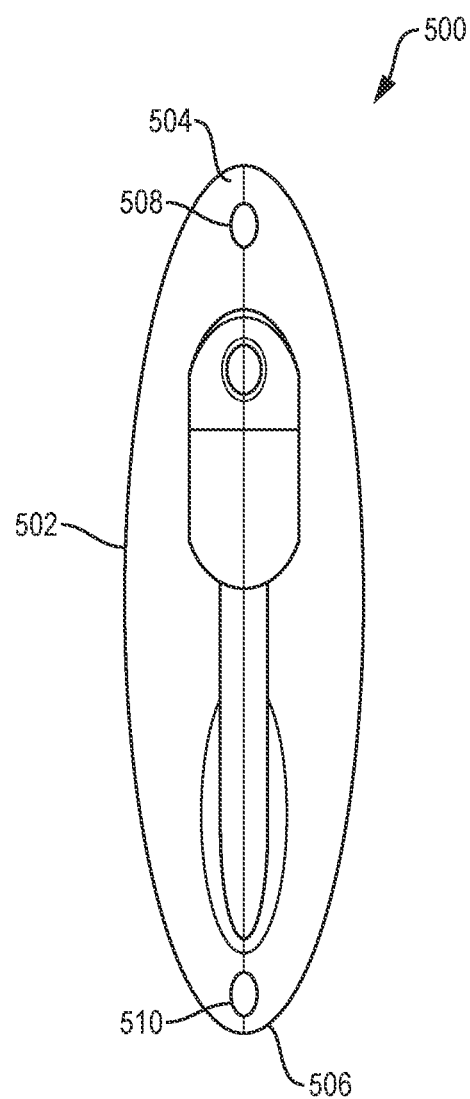
FIG. 11 is a front view of a rod bracket, in accordance with still yet another embodiment of the invention.
Figure 12A:
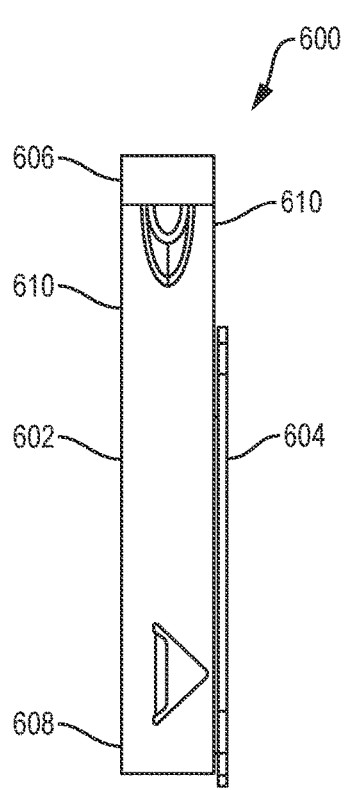
FIG. 12A is a front view of a rod bracket, in accordance with still yet another embodiment of the invention.
Figure 12B:
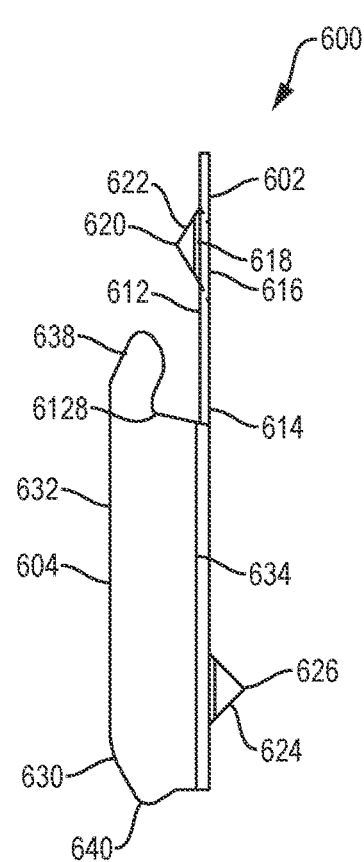
FIG. 12B is a side view of the rod bracket of FIG. 12A.
Figure 12C:
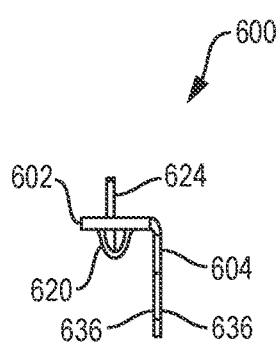
FIG. 12C is a top down view of the rod bracket of FIG. 12A.
Figures 12D, 12E:
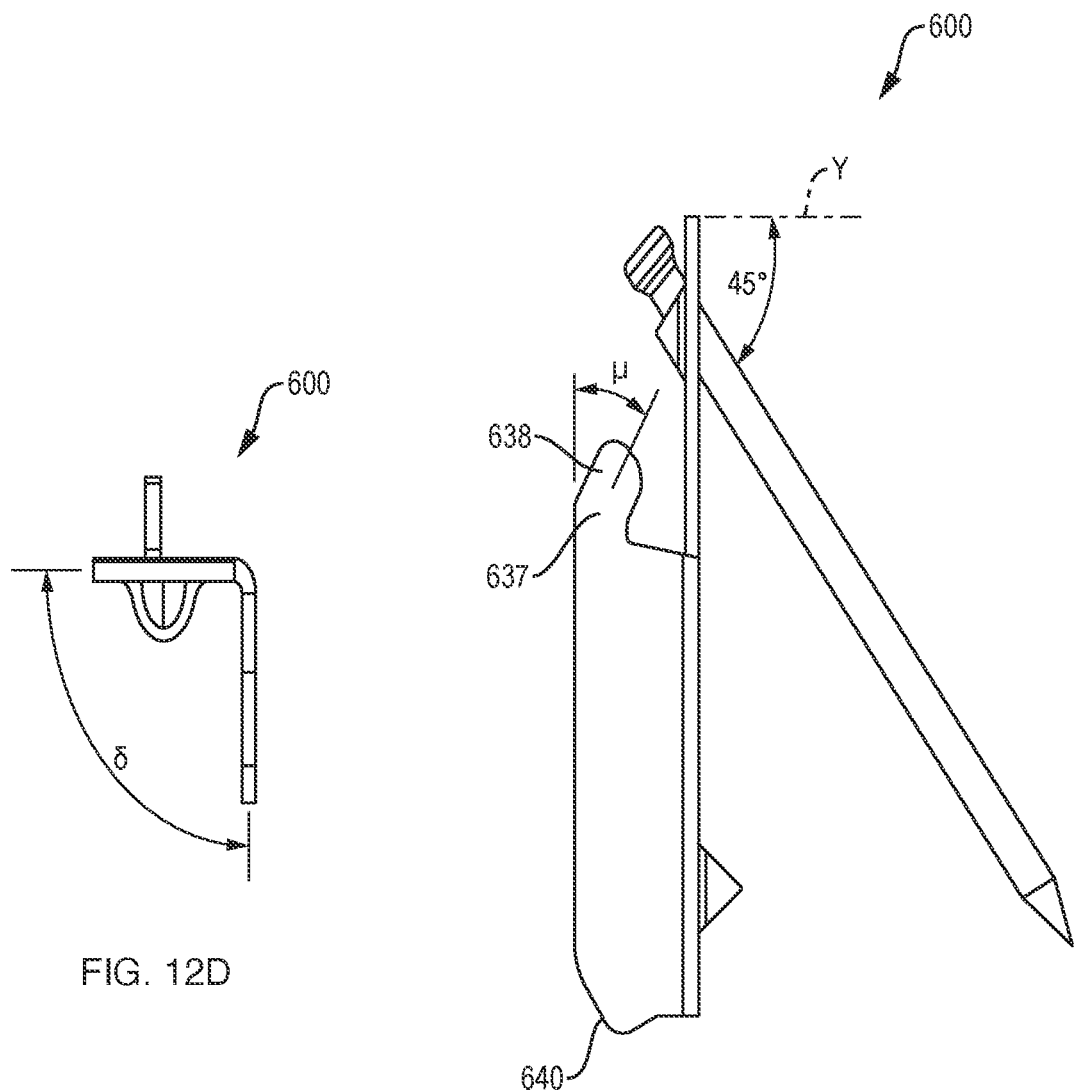
FIG. 12D is a top down view of the rod bracket of FIG. 12A.
FIG. 12E is a side view of the rod bracket of FIG. 12A.
Figure 12F:
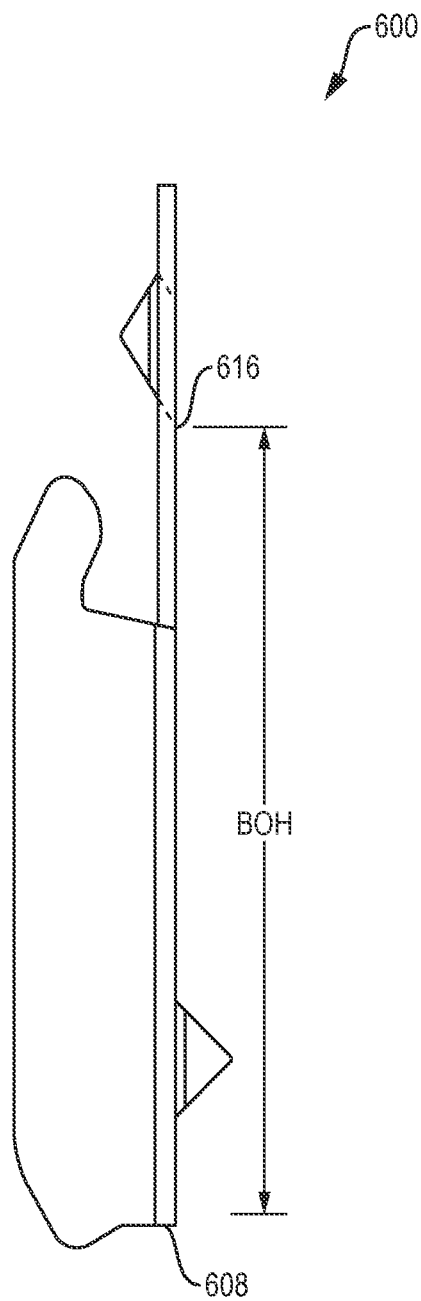
FIG. 12F is a side view of the rod bracket of FIG. 12A.

Referring to FIG. 11, still yet another embodiment of a rod bracket 500 is provided and includes a bracket base 502, wherein the bracket base 502 includes a base top 504 and a base bottom 506. The bracket base 502 defines a first base mount cavity 508 located in the center of the bracket base 502 proximate the base top 504 and a second base mount cavity 510 located in the center of the bracket base 502 proximate the base bottom 506.

Referring to FIG. 12A, FIG. 12B, FIG. 12C, FIG. 12D, FIG. 12E and FIG. 12F, still yet another embodiment of a rod bracket 600 is provided and includes a bracket base 602 and a bracket rod arm 604. The bracket base 602 includes a base top 606, a base bottom 608, base sides 610, a base front 612 and a base rear 614. The bracket base 602 includes a base rear opening 616, a base cavity 618 and a base mounting cradle 620 which defines a base front opening 622, wherein the base front opening 622 is communicated with the base rear opening 616 via the base cavity 618. It should be appreciated that the base front opening 622 and base cavity 618 are configured such that when the bracket base 602 is placed against a surface and a nail or screw is passed through the base front opening 622 and the base cavity 618, the nail or screw will enter the surface at an angle of about 45° relative to a horizontal plane Y. In one embodiment, the mounting cradle 620 may be formed out of the bracket base 602 and acts to hold the nail or screw at an angle of about 45° relative to a horizontal plane Y.

Furthermore, the bracket base 602 may further include a protrusion 624 (may include one or more protrusions 624) which extends out of and away from the base rear 614, wherein the protrusion 624 is located proximate the base bottom 608. The protrusion 624 (which may be a stabilizing spike) may include one or more sharp and/or pointed portion 626 which enters and engages the surface to which the rod bracket 600 is being mounted to provide stability. It should be appreciated that the protrusion 624 may be created from a portion of the bracket base 602 (such as by a 'punch out' or 'cut out') or the protrusion 624 may be connected to the base rear 614, via welding or other suitable connection device and/or method.

The bracket rod arm 604 includes a rod arm top 628, a rod arm bottom 630, a rod arm front 632, a rod arm rear 634 and rod arm sides 636. The rod arm rear 634 is connected to one of the base sides 610 such that the bracket rod arm 604 is configured to be at an angle 45 (which may be about 90°) relative to the base front 612, wherein the bracket rod arm 604 extends away from the base front 612. The bracket rod arm 604 includes rod support structure 637 which includes an engagement structure 638 which protrudes from the rod arm top 628 and is angled back toward the bracket base 602 at an angle tt, wherein t may range from about 15° to about 30° relative to the rod arm front 632. Additionally, the rod arm bottom 630 includes a protrusion 640 which extends out of and downward from the rod arm bottom 630. It should be appreciated that in at least one embodiment, the bracket rod arm 604 is disposed to be proximate the rod arm bottom 630 and/or the engagement structure 638 is located lower on the bracket base 602 than the base mounting cradle 620.

Referring again to FIG. 12F, it should be appreciated that the bracket base 602 includes a Base Opening Height (BOH) which is defined as the distance between the base (i.e. bottom) of the base rear opening 616 and the flange on the bracket bottom 608. It should be appreciated that in at least one embodiment, BOH is at least about 1 inch or greater (with an error of about ±15%). In other embodiments, BOH may be more or less than 1 inch. Referring to FIG. 12G, FIG. 12H and FIG. 12I, one embodiment of the rod bracket 600 is shown with dimensions.

In accordance with embodiments of the invention and referring to the FIGS., the rod bracket 100, 200, 300, 400, 500 operates as follows. Referring to the FIGS., the rod bracket 100, 200, 300, 400, 500 is placed on a flat surface, for example a wall, such that the base rear 116, 212 of a first rod bracket 100, 200, 300, 400, 500 is flat against the flat surface. A first nail is inserted into the first bracket base front opening 124, 220 and hit with a hammer (or other hard item) until the first nail traverses the first base mount cavity 120, 216 and exits out of the first bracket base rear opening 128, 224 and enters the flat surface. The first nail is driven into the flat surface until a small portion of the first nail is protruding out of the first bracket base front opening 124, 220. A second nail is then inserted into the second bracket base front opening 126, 222 and hit with a hammer (or other hard item) until the second nail traverses the second base mount cavity 122, 218 and exits out of the second bracket base rear opening 130, 226 and enters the flat surface. The second nail is driven into the flat surface until a small portion of the first nail is protruding out of the second bracket base front opening 126, 222. This is then repeated for a second rod bracket 100, 200, 300, 400, 500.

A curtain rod is then positioned within the rod cavity 138, 238 of the first and second rod brackets 100, 200, 300, 400, 500 and a rod mounting screw 148, 250 is inserted into the cradle mounting cavity first opening 141, 244 of the first rod bracket 100, 200, 300, 400, 500 and rotated. The threaded screw surface 152, 252 and the threaded cavity surface 150, 248 thereby engage each other securely containing the rod mounting screw 148, 250 within the cradle mounting cavity 142, 242 such that a portion of the rod mounting screw 148, 250 is protruding from the cradle mounting cavity second opening 143, 246. The portion of the rod mounting screw 148, 250 that is protruding from the cradle mounting cavity second opening 246 is pressing against the curtain rod that is contained within the rod cavity 138, 238, thereby securely containing the curtain rod within the rod cavity 138, 238. This is then repeated for the second rod bracket 100, 200, 300, 400, 500. It should be appreciated that in some embodiments, a resilient (i.e. spring biased) mounting pin may be used to hold the curtain rod within the rod cavity 138, 238. In such an embodiment, the mounting pin would be retracted until the curtain rod was located within the rod cavity 138, 238. When the curtain rod is located in the rod cavity 138, 238, the mounting pin would be released and the spring biasing would cause the mounting pin to compress against the curtain rod thereby securely containing the curtain rod within the rod cavity 138, 238. Moreover, in still yet another embodiment, protrusions may be located on the walls that define the rod cavity. Thus, when the curtain rod is located in the rod cavity 138, 238 the protrusions would frictionally contain the curtain rod within the rod cavity 138, 238.

It should be appreciated that the rod bracket 100, 200, 300, 400, 500, 600 may be configured to have one or more base mount cavities 118, 214, 314, 414, 514, 622 as desired. It is also contemplated that the rod bracket 100, 200, 300, 400, 500, 600 may be constructed from one piece or via multiple pieces connected together. Moreover, it should be appreciated that the rod bracket 100, 200, 300, 400, 500, 600 may be constructed from any material and/or combination of materials as desired suitable to the desired end purpose, such as for example, plastic, composite, metal, wood, etc. Additionally, it should be appreciated that the rod bracket 100, 200, 300, 400, 500, 600 may be sized as desired and as suitable to the desired end purpose.

In embodiments, one of the needs present in the industry is ease of installation. Solutions that involve use of multiple tools (e.g., drills, screw drivers, levels), in-wall anchors, and the like are the norm and have been assailed as difficult, at best when it comes to installation. An in-wall anchor does not work in all wall board type installations, such as if a structural element is located behind the wall board. A feature of the solutions exemplified herein is the universal approach to installation that is independent of the absence or presence of a conventional wood frame wall structure at the point of installation. This universal approach to installation merely involves use of intentionally placed and oriented mounting fasteners (e.g., prongs, nails, and the like) that, in embodiments can be driven into the mounting surface (e.g., a plaster wall board) with at most a hammer. In embodiments, fasteners generally used with a hammer may be wall-penetrating fasteners, such as nails (with various features, such as serrations, barbs, and with various shapes, such as straight, rounded, curved, compound shaped and the like), pins, barbs, prongs, and the like. For certain installations, even a hammer is not needed as the wall-penetrating fasteners can be pressed into the wall board. The placement of these wall-penetrating fasteners is derived from an analysis of the mechanics of the bracket in relation to the item that the bracket is to retain (e.g., a curtain rod and the like). This easy installation benefit can be achieved through use of wall-penetrating fasteners that pass through apertures in the bracket that are oriented to ensure the wall-penetrating fasteners penetrate the wall at an angle relative to the mounting surface (e.g., the back) of the bracket so that a downward force on the bracket (e.g., from draperies hanging on a curtain rod supported by the bracket) up to several inches away from the wall surface does not compromise the integrity of the bracket function. Other mounting elements may be used as well including captive hardware, hard-attached hardware (e.g., one or more wall-penetrating fasteners extending downward at a 30 to 60 degree angle relative to vertical that extend from the back of the bracket), two piece bracket and wall-mounting plate hardware, and the like. These and other embodiments will be described further herein.

Figure 13:
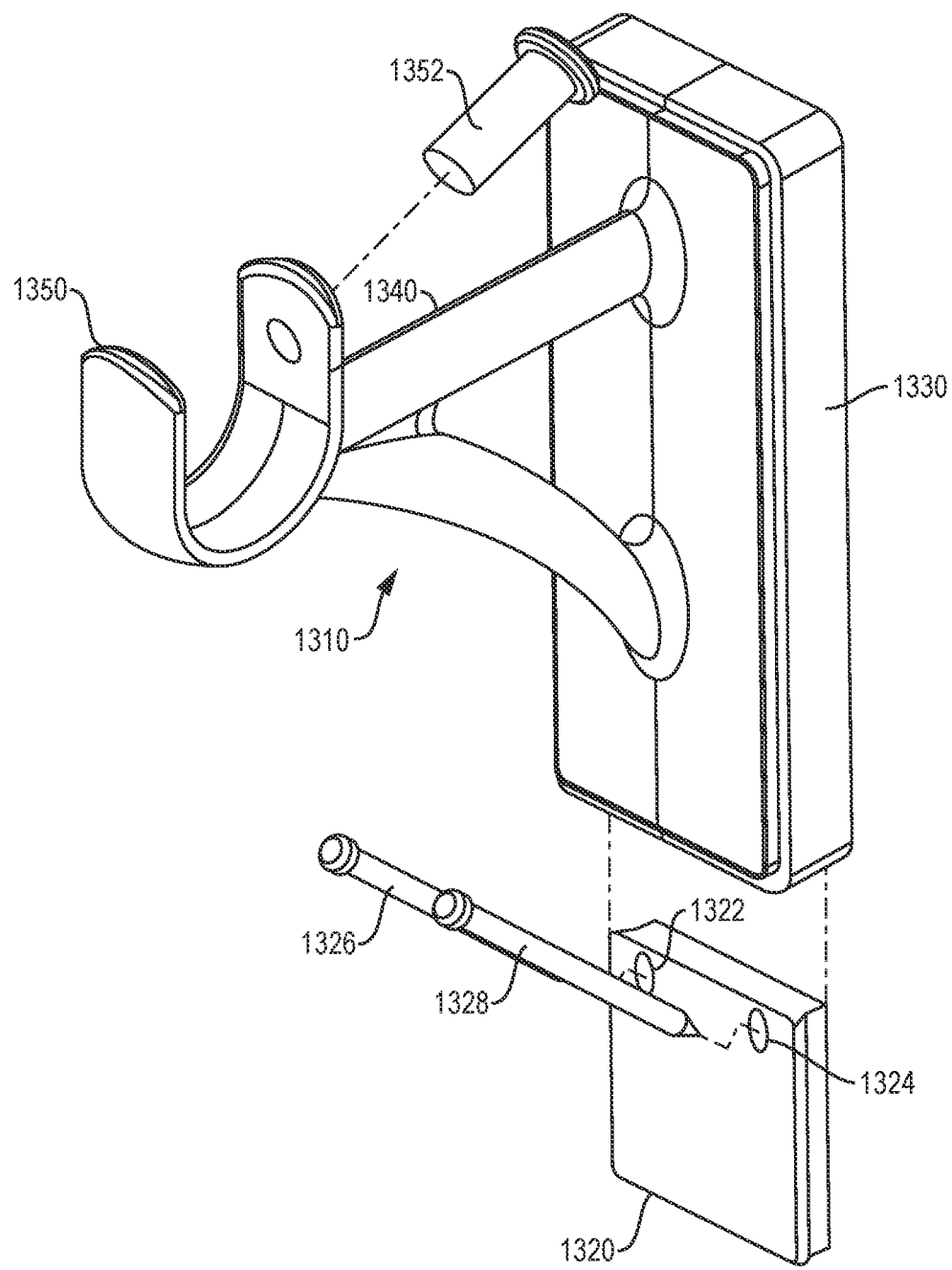
FIG. 13 is an illustration of a first embodiment of an exemplary fast fit bracket system.

As shown in FIG. 13, a first embodiment of an exemplary fast fit bracket system 1300 includes a bracket 1310 and a fastening plate 1320 having apertures 1322, 1324 to receive finishing nails 1326, 1328, respectively. In a preferred embodiment, an angle of the apertures 1322, 1324 is 45 degrees relative to the fastening plate 1320. It should be appreciated that the shape and design of the bracket 1310 can vary. In addition, it should be appreciated that the finishing nails 1326, 1328 may be replaced with other securing objects, such as screws. In the example embodiment, the bracket 1310 includes a back plate 1330, an arm 1340 and a curtain rod cradle 1350. The curtain rod cradle 150 is configured to receive a curtain rod (not shown) that is secured within the curtain rod cradle 150 with a rod support set screw 1352. As will be described further, the bracket 1300 is configured to mate with the fastening plate 1320 and the fastening plate 1320 is secured to a wall structure (not shown) by the finishing nails 1326, 1328.

Figure 14:
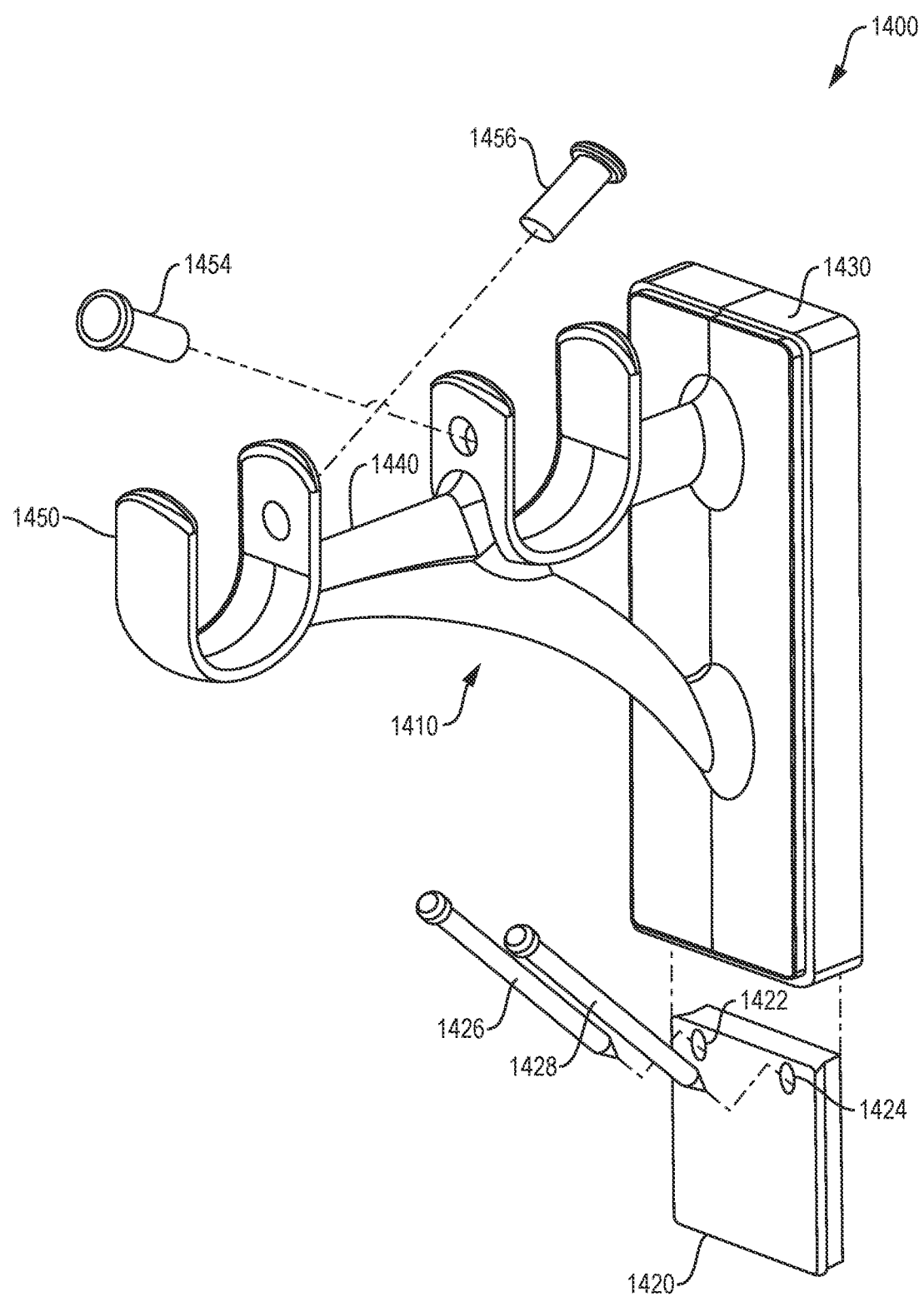
FIG. 14 is an illustration of a second embodiment of an exemplary fast fit bracket system.

As shown in FIG. 14, a second embodiment of an exemplary fast fit bracket system 1400 includes a bracket 1410 and a fastening plate 1420 having apertures 1422, 1424 to receive finishing nails 1426, 1428, respectively. In a preferred embodiment, an angle of the apertures 1422, 1424 is 45 degrees relative to the fastening plate 1420. In the embodiment shown, the bracket 1410 includes a back plate 1430, an arm 1440, a first curtain rod cradle 1450 and a second curtain rod cradle 1452. The curtain rod cradles 1450, 1452 are configured to receive curtain rods (not shown) that are secured within respective curtain rod cradles 1450, 1452 with rod support set screws 1454, 1456. As will be described further, the bracket 1400 is configured to mate with the fastening plate 1420 and the fastening plate 1420 is secured to a wall structure (not shown) by the finishing nails 1426, 1428.

Figure 15:
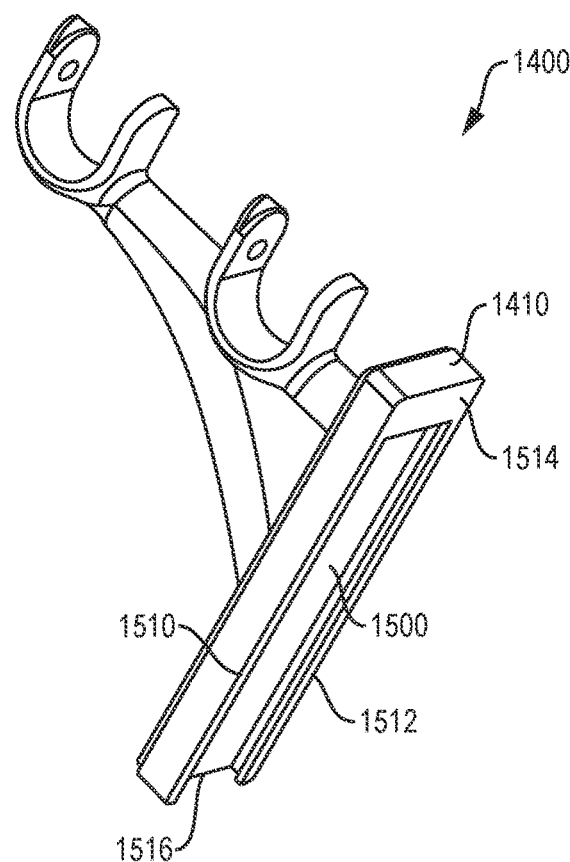
FIG. 15 is an illustration of an exemplary back channel of a bracket.

As shown in FIG. 15, each of the brackets, for example, bracket 1410, includes a back portion (i.e., the portion of the bracket 1410 opposite the arm 1440) configured with a channel 1500. The channel 1500 is formed by opposing side rails 1510, 1512 and a top rail 1514. A lower portion 316 of the channel is open ended. The channel 1500 is sized to snugly receive the fastening plate 1420. More specifically, after the fastening plate 1420 is secured to a wall structure, the channel 1500 of the bracket 1410 is slid over the fastening plate 1420, securing the bracket 1410 to the fastening plate 1420 and thus to the wall structure. The top rail 1514 of the channel 1500 limits upward travel and acts like a stop when the bracket 1410 is placed over the fastening plate 1420.

Figure 16:
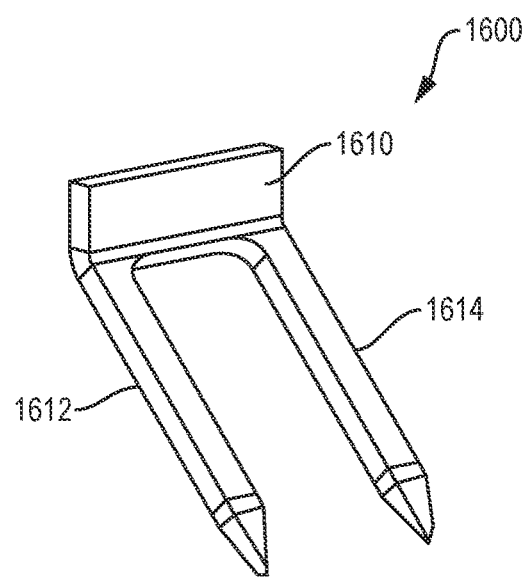
FIG. 16 illustrates an exemplary prong.

The fastening plates 1320, 1420 shown above, generally require use of a hammer or screwdriver in conjunction with nails or screws to secure the fastening plates 1320, 1420 to any wall structure. However, manual insertion may be used when the wall structure is standard wall board. But there are times in which a tool-less system would be preferred. Referring now to FIG. 16, in an alternate embodiment, the fastening plates 1320, 1420 are replaced by a prong 1600. The prong 1600 includes an exposed portion 1610 offset from two penetration portions 1612, 1614. A user presses the penetration portions 1612, 1614 into a wall structure and the exposed portion 1610 remains visible. The exposed portion 410 is manually placed into the channel 1500 until it abuts against the top rail 1514, thus securing the bracket 1310, 1310 to the wall structure.

Figure 17:
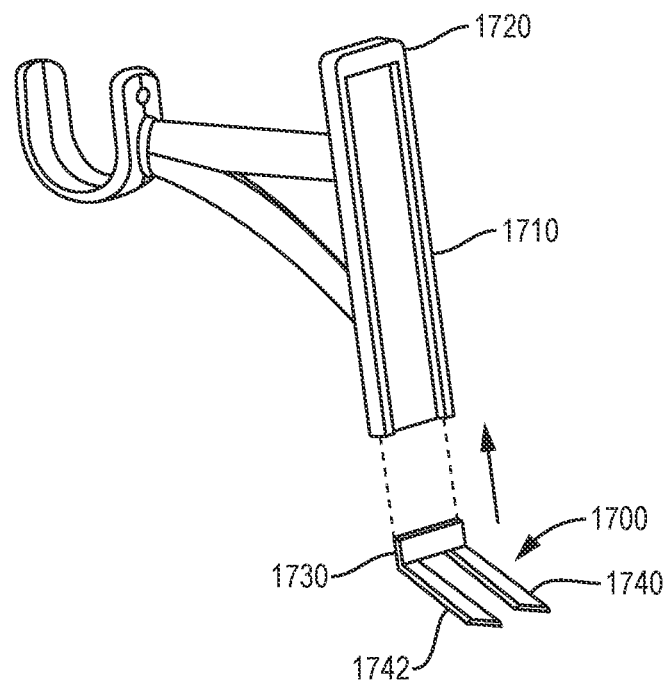
FIG. 17 illustrates an exemplary alignment of a prong relative to channel of a bracket.

In FIG. 17, alignment of a prong 1700 is shown relative to a channel 1710 of a bracket 1720. As described above, the channel 1710 is slid over an exposed portion 1730 of the prong 1700 after penetration portions 1740, 1742 are placed with in a wall structure.

Figure 18:
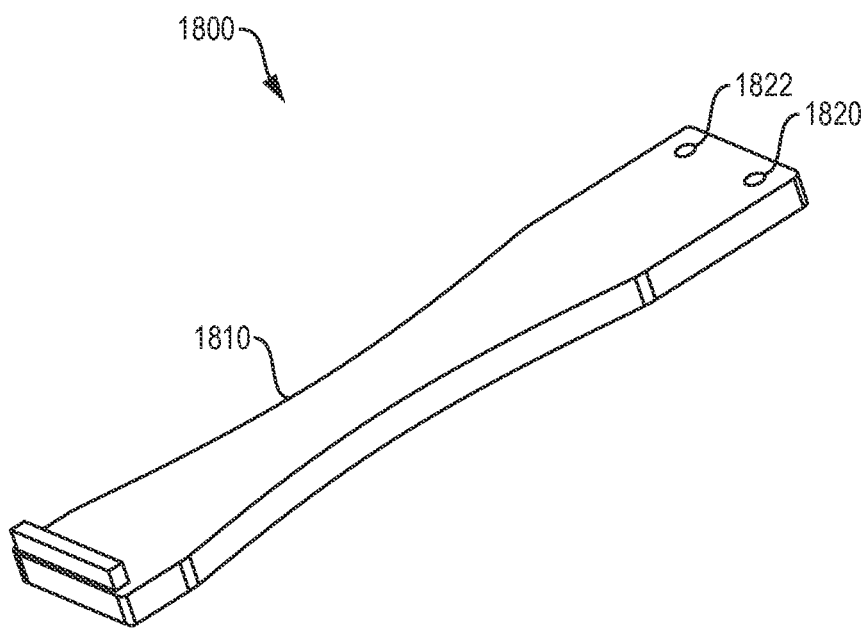
FIG. 18 illustrates an alternate fastening plate.

Referring now to FIG. 18, in one embodiment the fastening plates 1320, 1420 are replaced with a lengthened and shaped fastening plate 1800 to increase to stability. The fastening plate 1800 includes a tapered mid-section 1810, an upper portion that includes apertures 1820, 1822 for use with nails or screws (not shown) that are used to secure the fastening plate 1800 to a wall structure (no shown).

Figure 19:
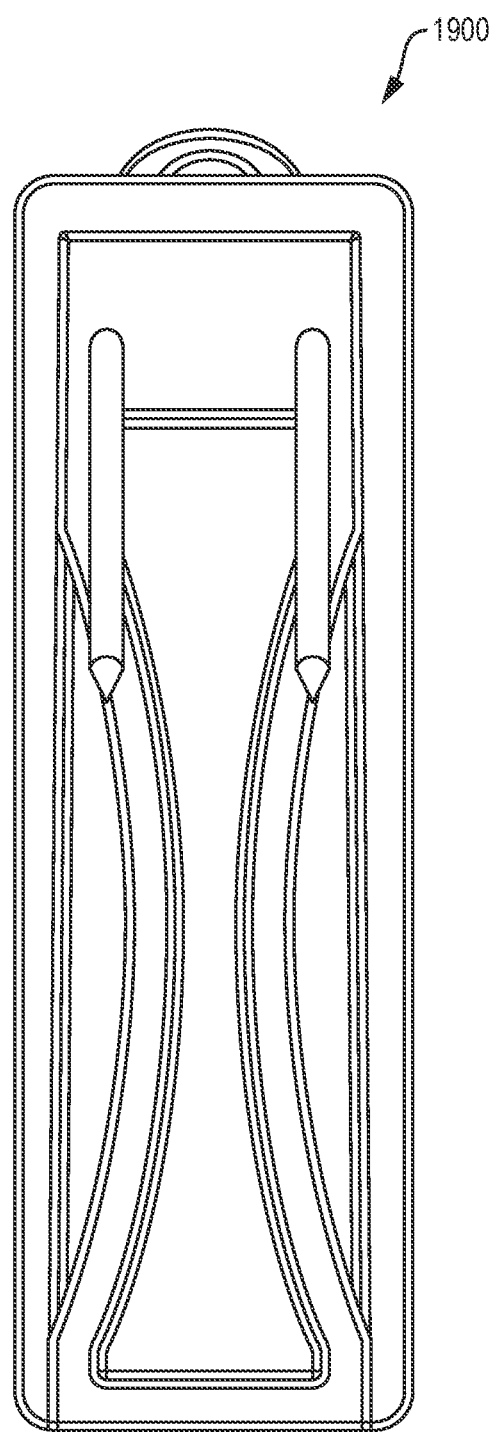
FIG. 19 illustrates an exemplary rear view of a fast fit bracket system.
Figure 20:
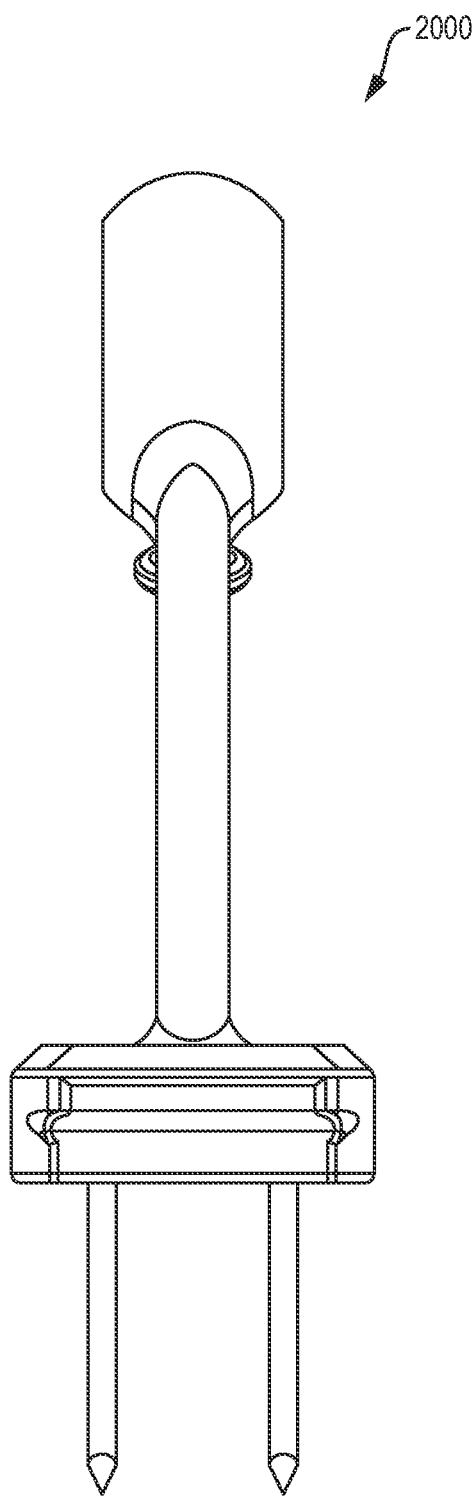
FIG. 20 illustrates an exemplary bottom view of a fast fit bracket system.

FIG. 19 illustrates an exemplary rear view of a fast fit bracket system 1900 and FIG. 20 illustrates an exemplary bottom view of a fast fit bracket system 2000.

Figure 21:
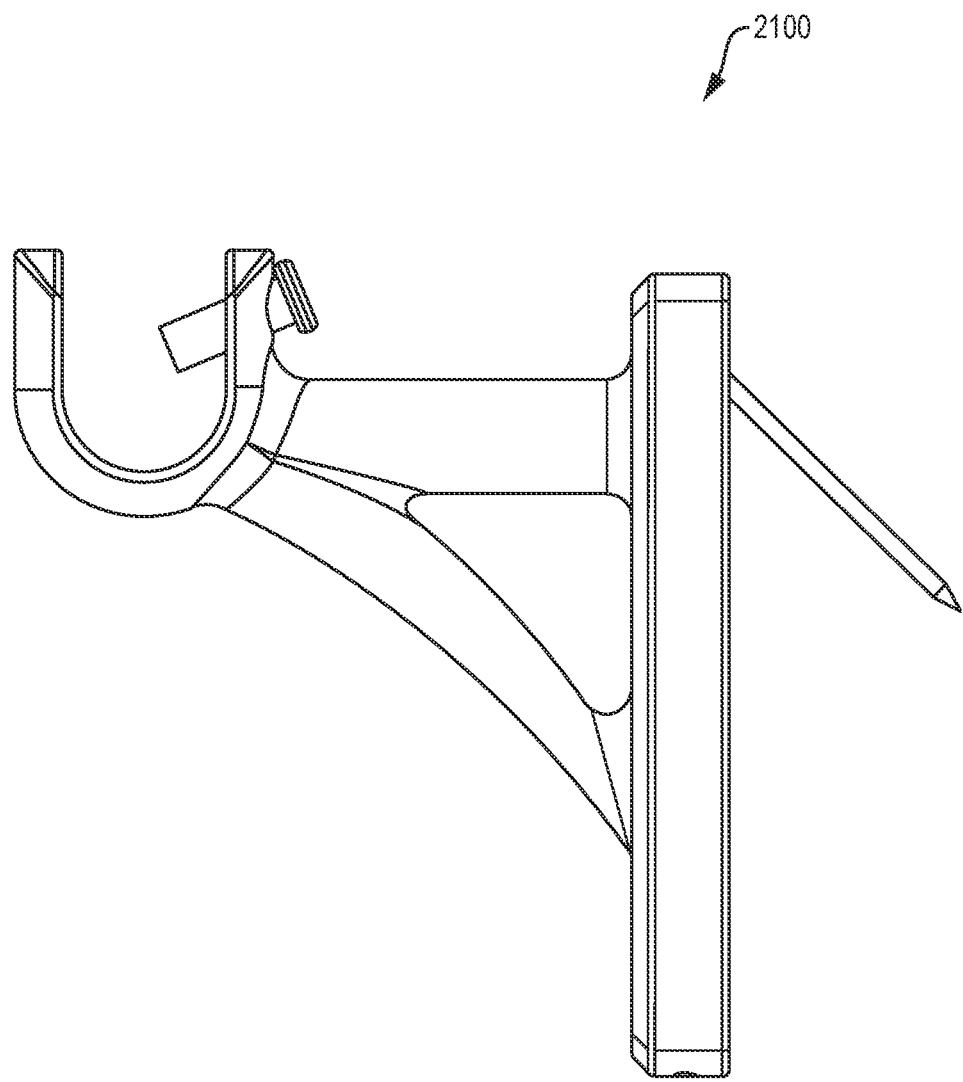
FIG. 21 illustrates an exemplary side view of a fast fit bracket system.

FIG. 21 illustrates an exemplary side view of a fast fit bracket system 2100.

In embodiments, the wall-penetrating fasteners may be positioned with an orientation that facilitates achieving a second need—reliability of installation. By providing properly oriented hardware for securing the bracket to a substantially vertical wall, needing nothing more than a hammer to drive home the wall-penetrating fasteners, the integrity of the installation is highly likely to be achieved. By placing the bracket with its back flush against the wall in the desired mounting location and orientation, the wall-penetrating fasteners that secure the bracket to the wall will be oriented properly as well. There will be no need for marking with the bracket or a template in place, followed by wall preparation steps, such as insertion of wall anchors that could, as a result of minor variation in this process result in an unreliable installation, or at least one that does not deliver the desired result, such as the bracket being offset or tilted relative to its desired position. The single-step installation process afforded by methods and systems exemplified herein contributes not only to ease but reliability as well.

In embodiments, the single-step installation process described here achieves meeting yet an additional need—low impact. Unlike conventional processes that involve substantive wall manipulation in preparation for mounting drapery hardware (and the like), the nail/prong-based methods and systems of wall bracket installation substantively reduce an impact on the wall on which the bracket is mounted. By positioning the bracket, especially with use of fixed or captive hardware versions of the bracket and driving the wall-penetrating fasteners into the wall, the impact is limited to the two wall-penetrating fasteners penetrating the wall board. Removal can be achieved through direct extraction of the bracket (optionally removing the wall-penetrating fasteners first), leaving only two small nail holes in the wall. This is substantively less impact that would result from using any type of wall anchor, and the like. A secondary benefit of low impact is ease of repositioning. If, after installation, the location of the bracket needs to be adjusted, the bracket/wall-penetrating fasteners can be removed as described herein and typically reused to reinstall the bracket. This secondary benefit is enhanced by the ability to make small scale adjustments in position, orientation and the like (e.g., move the bracket one quarter inch horizontally). Such small scale adjustments are essentially impossible when using wall anchors.

In embodiments, an anchorless-installed wall-mount bracket for hanging items such as curtains, towels and the like is described and depicted herein. Embodiments of such a curtain rod bracket, including various configurations and details of the structural aspects, such as placement and orientation of nail apertures, orientation and positioning of rod cradles, shape and materials, and the like may be found in U.S. patent application Ser. No. 16/018,979 filed Jun. 26, 2018 now published as of U.S. Pat. Appl. Publication No. 2018/0306219, the contents of which are incorporated herein by reference in its entirety.

In embodiments, an anchorless-installed wall-mount bracket for hanging items such as curtains, towels and the like that may include one or more of the features described in U.S. patent application Ser. No. 16/018,979 filed Jun. 26, 2018 now published as of U.S. Pat. Appl. Publication No. 2018/0306219, incorporated herein by reference in its entirety, may be configured with one, two, three or more apertures, captured fasteners (e.g., wall-penetrating fasteners), fixed-attached wall-penetrating fasteners and the like. A number of wall-penetrating fasteners may correspond to a maximum weight supportable by the bracket. One-nail configurations may be used in pairs for light weight applications, such as for hanging small café rods and curtains and the like. Two-nail configurations may be used individually or in sets (e.g., two or more) for medium weight applications, such as draperies that when combined with a rod and decorative finial may weigh up to approximately 50 pounds (for two-bracket applications), or approximately 25 pounds per bracket. Three and higher count nail configurations may be used individually or in sets (e.g., two or more) for higher weight applications, such as heavy weight draperies, solid rods and the like. Scalability of this fastening system may permit greater weight applications, such as through distributing the fasteners over a greater wall surface. In an example of scaling an anchorless-installed wall-mount bracket for heavier weight applications, fastener type may be adapted as well to include, for example, barbed, curved or self-expanding fasteners that distribute load hanging weight over a larger portion of a wall. When fastener type is combined with fastener count, it may be possible to support much greater weights and realize use in non-traditional applications, such as shelving, coat hangers, and the like.

Referring to FIG. 22, features, configurations, products, applications, use environments and the like of an anchorless-installed wall-mount bracket is depicted. Bracket applications 2202 include, without limitation, draperies, curtain rods, towel rods, rings, and hooks, shower curtain rods, pot and pan hooks, small appliance hanging, hand tools, clothing, shelving and the like. Bracket use environments 2204 include, without limitation, window coverings, kitchens, bathrooms, dormitories, workshops, stock rooms (e.g., shelving), lighting, decorative hangings, art galleries and the like. Bracket material and processing 2206 include casting, injection molding, stamping, forming, plating, painting, shrouding, and the like. Bracket kits 108 include dormitory kits, apartment kits, new construction kits, bathroom kits, kitchen kits, lighting kits, shelving kits, special/heavy duty kits, bracket-finial-rod kits, and the like. Bracket feature 2210 include internal window frame mounting, external frame and wall surface mounting, combined internal/external mounting, window corner self-aligning, reusability, removability, no wall preparation (e.g., no marking, measuring, drilling, anchor installation, and the like), single/no tool (e.g., hammer) installation, overweight load wall protection elements, adjustability of hanging arm length, adaptable/insertable rod-specific cradles, concealed fasteners and the like.

In embodiments, an overall size and optionally a shape of the bracket may further contribute to performance for various maximum weight uses. As an example, a bracket with a large wall-contact surface area may distribute its bearing weight over a greater area, thereby reducing the impact on small areas of the wall on which the bracket rests. A vertically elongated bracket may improve performance of at least heavy weight applications where a secondary cradle support arm is indicated. Other features of the overall shape, such as the sharpness of an edge of the bracket that contacts the wall may provide improved performance. For a performance object of minimizing potential wall damage, a smooth edge may cause less damage than a sharp edge.

In embodiments, vertical orientation of the nail apertures or captive hardware or fixed attached wall-penetrating fasteners relative to an attachment point of the cradle arm to the bracket mounting surface may impact reliability. By positioning the nail apertures, etc. above the cradle arm intersection point, downward forces due to hanging drapery and the like will cause the wall-mount surface of the bracket to be pressed against the wall, effectively attempting to close the gap between the wall-penetrating fasteners extending into the wall while forcing the wall-penetrating fasteners upward against wall board. Such nail aperture, etc positioning may also aid in installation and removal as only a pulling force aligned with axis of the wall-penetrating fasteners (e.g., approximately 45 degrees above horizontal) can cause the wall-penetrating fasteners to loosen in the wall board.

In embodiments, an anchorless-installed wall-mount bracket for hanging items such as curtains, towels and the like may be constructed from a range of materials, using a range of techniques including; casting of zinc and other castable metals; injection molding of plastic-type material, such as ABS plastic and the like; stamping from sheet or bar stock, such as aluminum bar stock and the like; bending/folding/forming from sheet or bar stock and the like. Features of an anchorless-installed wall-mount bracket for hanging items such as curtains, towels and the like, such as location and orientation of apertures, overall shape, rod set screws, and the like may be added during the primary construction operation, such as during injection molding or as a secondary operation, such as hole punching, drill/tap operations, and the like. In embodiments, a stamp produced bracket may have the integrated nail aperture added as a secondary operation.

In embodiments, an anchorless-installed wall-mount bracket for hanging items such as curtains, towels and the like may be finished with plating, painting, alternate material covers (e.g., shrouding, and the like). There may be many combinations of material type, finish, shape, and the like to address aesthetic, functional, cost and performance objectives, such as matching a bracket finish to a mating finial finish and/or to a curtain rod finish and the like. To achieve certain performance objectives, such as tarnish resistance, a non-tarnish plating may be selected. To achieve a cost objective, a plastic injection molded part may be textured in the molding process to provide an improved aesthetic without requiring secondary plating or painting operations.

The overall shape of the bracket and orientation of the nail apertures relative to a curtain rod cradle may be optimized to facilitate ease of installation. In embodiments, the wall-penetrating fasteners may be accessible for hammering without imposing substantive risk of the hammering operation damaging the cradle, such as by having the apertures disposed on a portion of the bracket that extends above the cradle arm.

In embodiments, a wall mount curtain rod bracket may be configured to facilitate protection of a wall on which the bracket is mounted when an over-weight condition is present, such as if drapery substantively heavier than the specified maximum weight (e.g., 25 pounds per bracket equivalent) is hanging on the brackets or when a person or pet pulls downward on the drapery or installed rod. These common situations may contribute to damage to the drapery, the rod, the bracket and/or the wall. In embodiments, an anchorless-installed wall-mount bracket for hanging items such as curtains, towels and the like or equivalent may be configured with a point of failure wall-safety feature that, during sufficient over-weight conditions, relieves the bracket of at least the load weight that is in excess of the specification. In embodiments, the wall-safety feature 2302 may comprise a portion of the arm, cradle, racket base, and the like that fails (e.g., breaks apart, separates, and the like) under an excess weight load condition. In embodiments, a wall-safety portion 2302 of a bracket arm that secures a rod cradle to the base may be designed to withstand at least 25 pounds of downward force proximal to the rod cradle. The wall-safety portion 2302 may fail (e.g., snap away and the like), when a downward pressure greater than a wall-safety breakaway threshold (e.g., 26 pounds for example) is present. In embodiments, the downward force (breakaway threshold) required to cause the wall-safety portion 2302 to fail may be substantively higher than 25 pounds, such as 30 pounds or more. In embodiments, the breakaway threshold may be determined based on the size and/or shape of the base portion of the bracket that contacts the wall surface. A bracket with a wide base portion may be configured with a higher breakaway threshold than, say a bracket with a narrow base portion. The wide base portion may facilitate distributing the over-weight condition over a larger surface area, effectively reducing the force per unit area when compared to the same over-weight condition being present on a narrow base portion. In embodiments, a breakaway wall-safety portion 2302 of such a bracket may be disposed proximal to a load point, such as a rod cradle. While an overweight load wall protection feature is described herein as a breakaway portion, there may be other techniques for facilitating protection of a wall, and/or indicating a root cause for wall damage due to an overweight condition. In embodiments, a visual indicator, such as a feature that is deformed under an over-weight condition may be configured into the bracket. When such an indicator is activated, product-related benefits, such as warrantees and the like may be affected. In embodiments, a result of activating such an indicator may be visual (e.g., as described above), audible, wireless communicated, and the like. In embodiments, a wall safety feature may be constructed of a material that is adapted to generate the overweight condition indicator and/or breakaway to protect the wall. This material may be different than the remainder of the bracket. In an example, a cast zinc bracket may include a plastic portion disposed proximal to the rod cradle that serves the wall safety function. A range of techniques for making the wall-safety portion effective may include reducing the strength/thickness/density and the like of the portion during production, resulting in the wall-safety portion being weaker than the remainder of the bracket. Other potential wall-safety features may include breakaway wall-penetrating fasteners, breakaway nail apertures, snap-off nail heads, and the like.

Embodiments of an anchorless-installed wall-mount bracket for hanging items such as curtains, towels and the like may include some form of visible heads of wall-penetrating fasteners disposed through the apertures. Additionally, when hammering is performed to install the bracket to the wall, minor damage to at least the portion of the bracket near the apertures may occur. Also, by requiring the apertures to be assessable for hammering, design options, such as size, shape, color, finish, and the like for the entirety of the bracket is affected. Additionally, while the function served by the wall-penetrating fasteners of attaching the bracket to the wall is universal for all brackets, the external portion of the bracket extending from the wall surface can vary highly in style, size, and function (e.g., number of rod cradles and the like). Therefore, embodiments of an anchorless-installed wall-mount bracket for hanging items such as curtains, towels and the like may include concealed hardware.

Figure 23:
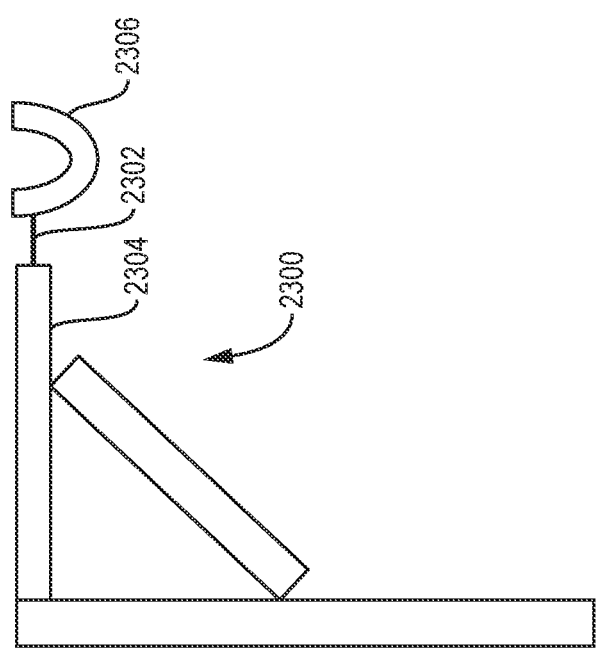
FIG. 23 depicts a side view of a wall protecting version of an anchorless-installed wall-mount bracket.

Referring to FIG. 23, an exemplary, non-limiting embodiment of a wall-protecting variant of the anchorless-installed wall-mount bracket is depicted. A bracket 2300 may include a wall-protecting "fail first" portion 2302 disposed between a curtain rod cradle/hanging feature 2306 and a cradle arm 2304 that is securely attached to/integrated with a wall mounting base of the bracket 2300. As described herein the wall-protecting portion may be configured to separate the cradle 2306 from the arm 2304 when a load placed on the cradle 2306 exceeds a wall-safety threshold, typically at least a few pounds greater than the specified load bearing capacity of the bracket 2300.

In embodiments, concealed hardware embodiments may include two-piece bracket system that includes a concealable plate (e.g., a universal base suitable for use with a wide range of bracket bodies) and a visible bracket body to meet a wide range of style options, material options, and functionality, such as for hanging curtains, drapery, two or more curtain rods, towels, clothing, appliances, kitchen items, and the like. Exemplary embodiments may be described and depicted in U.S. patent application Ser. No. 16/358,204 filed Mar. 19, 2019 now published as U.S. Pat. Appl. Publication No. 2019/0282017, the contents of which are incorporated herein by reference in its entirety. A universal concealable plate may include separate wall-penetrating fasteners (e.g., nails) that operate to fasten the plate to the wall surface; captive fasteners (e.g., nails); or integrated fasteners (e.g., barbs that extend away from a surface of the plate to be pressed into a wall board, and the like).

In embodiments, concealed hardware embodiments may include a single piece bracket with an optional removable element to cover a portion of the bracket proximal to the apertures so that the wall-penetrating fasteners and any co-located effect of hammering may be concealed. In embodiments, concealed hardware embodiments may include a single piece bracket with an attached cover that slides and/or rotates to expose and/conceal the portion of the bracket proximal to the apertures so that the wall-penetrating fasteners and any co-located effect of hammering may be concealed.

Figure 24:
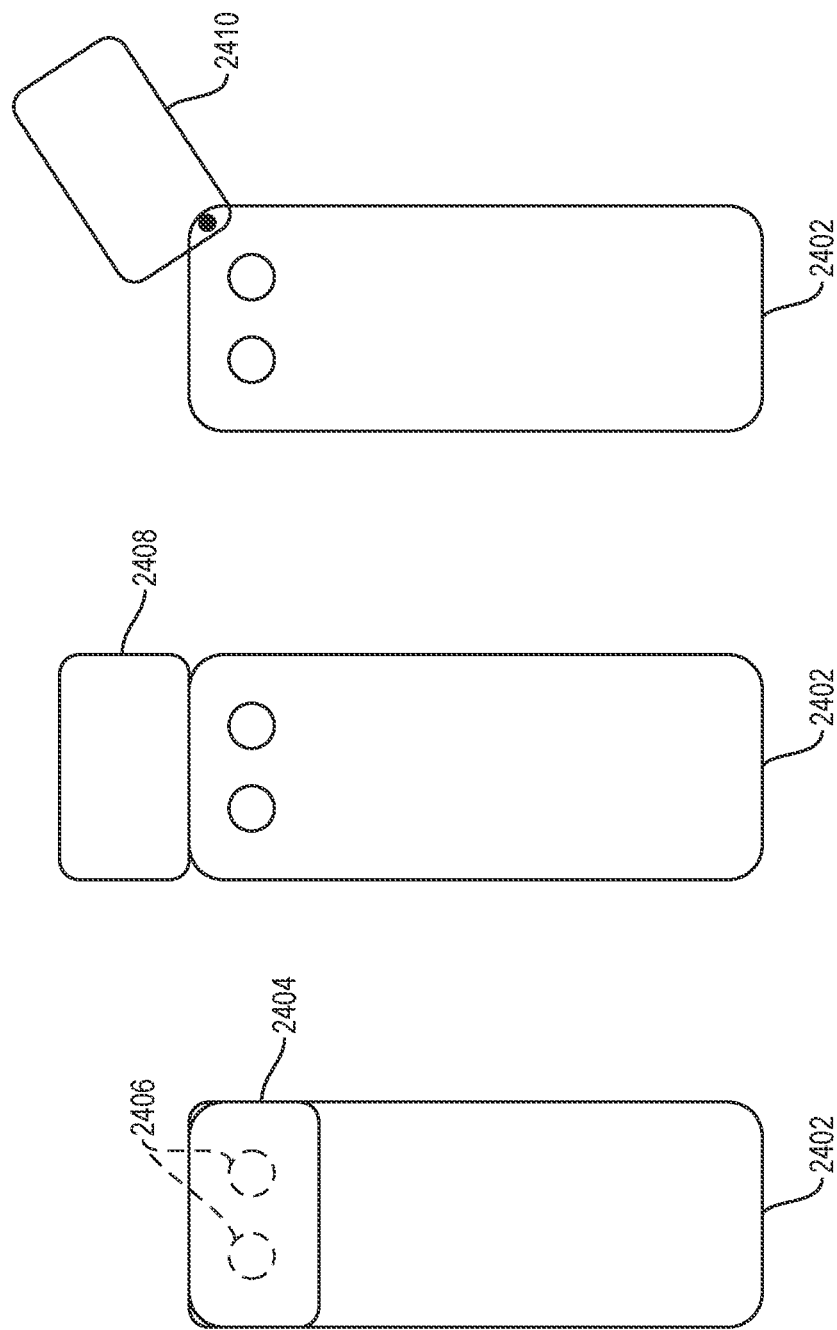
FIGS. 24A, 24B and 24C depict three variants of a concealed fastener anchorless-installed wall-mount bracket.

Referring to FIGS. 24A, 24B and 24C, exemplary embodiments of various concealed hardware anchorless-installed brackets are depicted. Bracket 2402 may be installed so that a fastener cover 2404 is disposed to cover the fasteners 2406. The fastener cover 2404 may be moveable and/or removable to expose the fasteners 2406 for access during installation and removal of the bracket. In embodiments, a sliding or hinged cover 2408 may be configured with the bracket 2402 so that by sliding or flipping up the cover 308 the fasteners 2406 are exposed. In embodiments, a rotatable cover plate 2410 may be configured with the bracket 2402 so that the cover plate 2410 can be rotated so as to expose the fasteners 2406 and/or the apertures through which the fasteners 2406 are to be installed.

Figure 25:
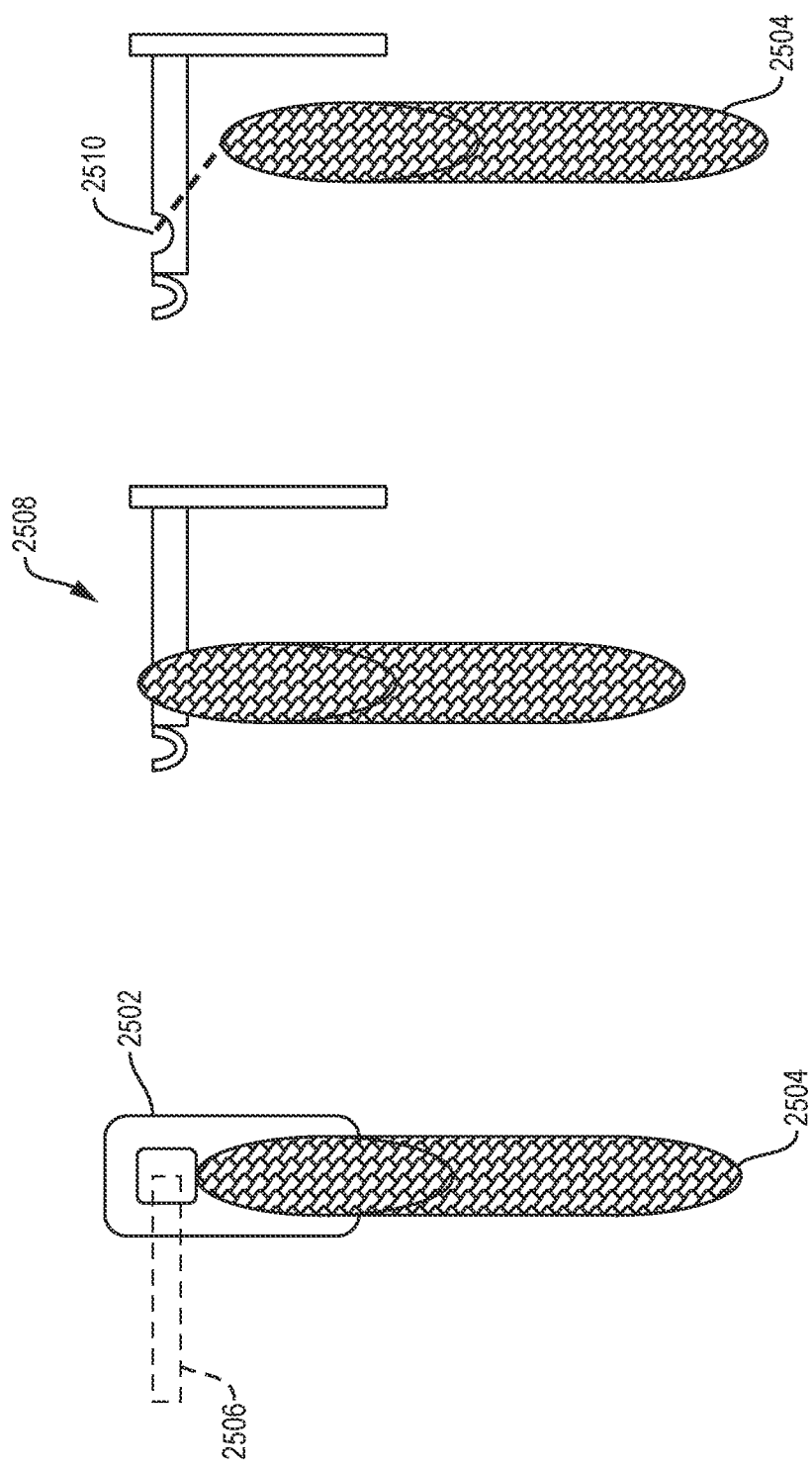
FIGS. 25A, 25B and 25C depict variants of an anchorless-installed wall-mount bracket with integrated and/or attachable finial.
Figure 26:
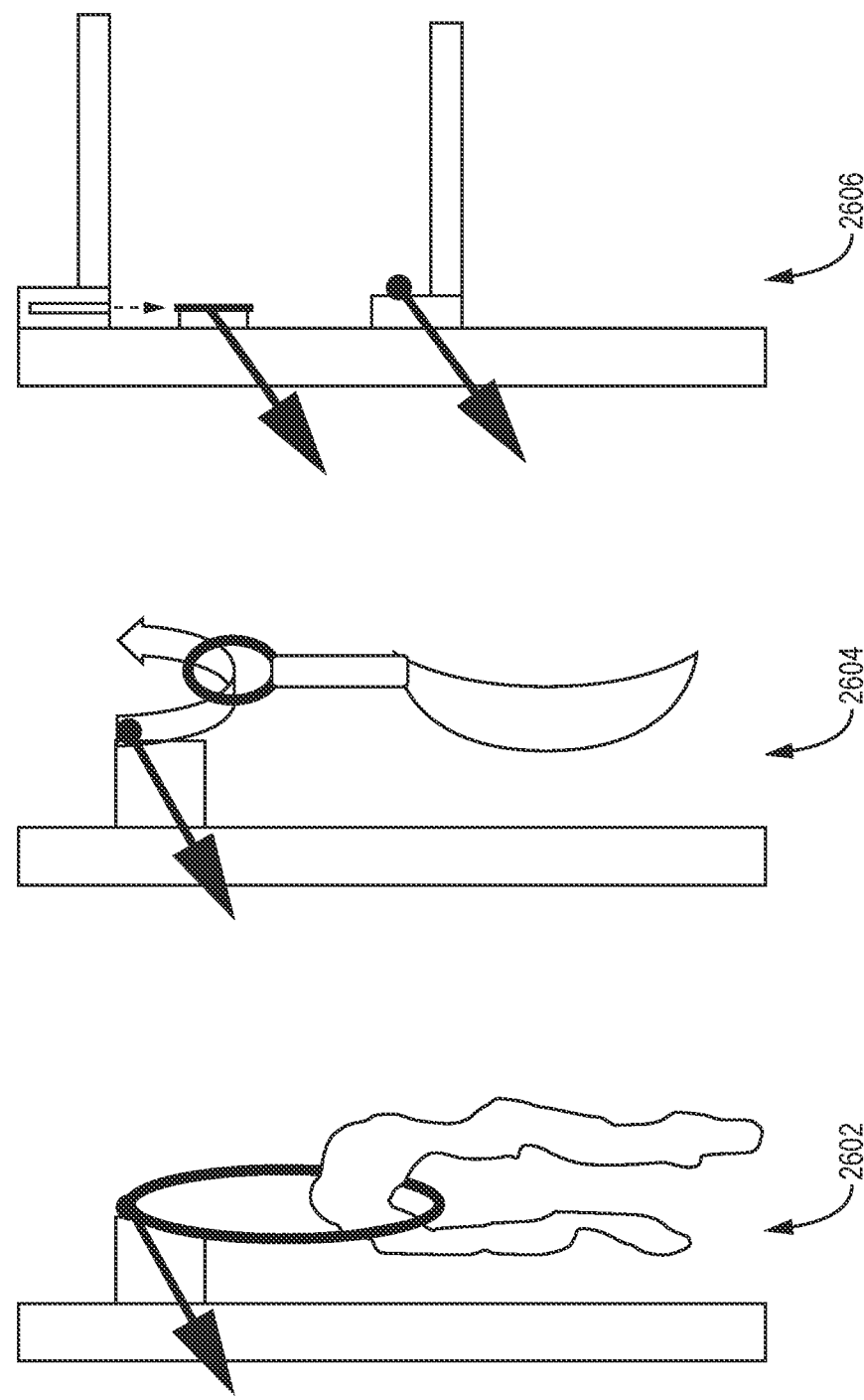
FIGS. 26A, 26B and 26C depict various use cases for an anchorless-installed wall-mount bracket, including use with a towel ring, use with a pot hanger, and use with shelving including one-piece and two-piece shelf versions.

Embodiments may include versions that facilitate fastening one or more finials directly to the bracket rather than requiring installation to an end of a curtain rod. This may reduce complexity of the rod while enabling use of a wide range of rod types independent of a choice of finial. Additionally, finials that attach (typically through screwing into an end of a rod) are generally symmetric in shape since it may be difficult to ensure which portion of the finial will be exposed. Therefore, providing finial attachment features to the bracket may facilitate use of alternative, non-symmetrical finials. Exemplary embodiments are depicted in FIG. 25. A finial-mount version of a wall-mount curtain rod support bracket may support internal mount (within the window frame) versions, external (wall-mount) versions, combination versions, single and double rod versions, and the like.

Referring to FIGS. 25A, 25B and 25C various non-limiting exemplary embodiments of a bracket 2502 that provides support for directly attaching a finial 2504 thereto. In a first variant, a bracket 2502 may be configured to support a curtain rod 2506. The bracket 2502 in this first variant may include a finial 404 that may be integrated with the bracket 2502 or attached to the bracket independently of the rod, including how the rod attaches to the bracket. In an example, a round or swivel sash rod that is not functionally compatible with a rod-end installed finial, may be used with the finial supporting bracket 2502 so that a finished installation of the round or swivel sash rod may include a finial. In this variant, the finial maybe attached below, adjacent, or in front of the rod arm. A second variant 2508 depicts a finial attached to a side of the lateral curtain rod cradle support arm. A third variant includes a bracket 12 configured with a rod cradle arm that includes a finial attachment feature 2510 to which a finial 2504 may be attached.

Referring now to FIG. 26 FIGS. 26A, 26B and 26C, in embodiments, an anchorless-installed wall-mount bracket may be configured for use in a bathroom, such as for hanging items such as curtains, towels 2602 and the like may include versions that facilitate hanging towels, hand-held mirrors, brushes, hair dryers, toilet paper dispensers, shower curtain rods, caddies for tooth brushes, and the like. Other embodiments an anchorless-installed wall-mount bracket may be configured for use in a kitchen, such as for hanging dish towels, cooking utensils, pots/pans 2604, hand-held appliances and the like. Yet other embodiments an anchorless-installed wall-mount bracket may be configured for use in a workshop for hanging small hand-held tools, cords, shop aprons, and the like. In yet other embodiments an anchorless-installed wall-mount bracket may be configured for use to support shelving 2606, such as decorative shelving, utility shelving and the like. In further embodiments, an anchorless-installed wall-mount bracket may be configured for use with lighting products, such as wall-mount low-power lighting that may not require fixed wiring, including wall sconces, task lighting, spot lighting, flood lighting, motion detectors/lighting and the like. Other embodiments may include use of an anchorless-installed wall-mount bracket may be configured for supporting display electronics, such as computer/television monitors and the like. Such embodiments may be configured with installation features described herein and in U.S. patent application Ser. No. 16/358,204 filed Mar. 19, 2019 now published as U.S. Pat. Appl. Publication No. 2019/0282017 and U.S. patent application Ser. No. 16/018,979 filed Jun. 26, 2018 now published as of U.S. Pat. Appl. Publication No. 2018/0306219, such as hammer-in installation with wall-penetrating fasteners, visible and/or concealed hardware, various finishes, shapes, and weight bearing limits, and the like.

Figure 27:
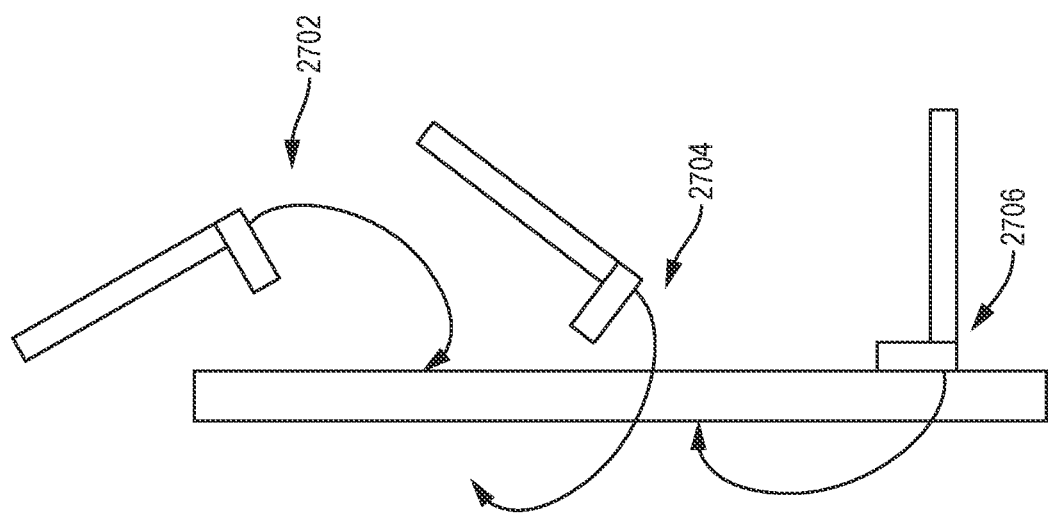
FIG. 27 depicts a curved fastener push-in anchorless-installed wall-mount bracket.

In embodiments, an anchorless-installed wall-mount bracket may be configured with push-in wall-penetrating fastener(s) 1802 for use with hollow walls, such as plasterboard walls. A push-in bracket may be configured with a curved fastener that penetrates the wall at an angle 1804 and loops up and back 1806 toward the inner surface of the penetrated wall board. The push-in fastener may be a curved barb that is fixed to the bracket or to a concealed wall plate in a two-piece embodiment such that the back surface of the bracket/plate where the barb attaches can be pushed flush with the exterior wall surface. An exemplary embodiment is depicted in FIG. 27. Any of the functional variations of an anchorless-installed wall-mount bracket described and/or depicted herein may be combined with a push-in feature. Such combinations may facilitate push-in installation of towel rings, coat hangers, curtain rod brackets, pot hangers, and the like.

The methods and systems of an anchorless-installed wall-mount bracket can be applied to a wide range of wall-hanging needs. These needs may be consolidated into functionally related kits to further provide access to the benefits of easy, reliable, low-impact installation for events, such as students moving into a dormitory, new home owners moving into a new home, setting up an apartment, and the like. In embodiments, medium and large scale activities, such as remodeling or newly constructing several apartments and the like may benefit from the such kits by providing a single line item that contractors can order to receive all the items needed for a project, such as a bathroom. Additionally, the ease of installation of items in such a kit can save substantively on labor costs and risks for needing to repair errors in installation. Several exemplary kits of an anchorless-installed wall-mount bracket for application specific use are depicted in FIG. 28. Exemplary kits include a dormitory kit 2802, a kitchen kit 2804, a lighting kit 2806, a bath kit 2808, a workshop kit 2810, a drapery kit 2812, and a shelving kit 2814.

General features and benefits of the embodiment of an anchorless-installed wall-mount bracket described and depicted herein and in U.S. patent application Ser. No. 16/358,204 filed Mar. 19, 2019 now published as U.S. Pat. Appl. Publication No. 2019/0282017 and U.S. patent application Ser. No. 16/018,979 filed Jun. 26, 2018 now published as of U.S. Pat. Appl. Publication No. 2018/0306219, may include finials that are attachable to a curtain rod cradle arm of a bracket, brackets with integrated finials, internal window frame mount brackets, external wall/window frame mount brackets, combined internal/external mount brackets with fasteners on one or two mounting surfaces, window frame corner alignment features built into the bracket, window frame corner alignment features built into a reusable template, window frame corner alignment features built into a break-away portion of the bracket and/or into a template. Other features and benefits include supporting a wide range of bracket shapes including rounded (e.g., round, vertically elongated oval and the like), brackets with corners (e.g., vertically elongated rectangle, triangle, hexagon, octagon, and any other number of sides) and the like. Yet other benefits of an anchorless-installed wall-mount bracket include ease of installation, single tool installation, optional tool-less installation, reusability, no wall prep for installation, removable, low impact to the wall, no need for adhesive, no need for screws or wall anchors, and use on a plurality of wall types (wall board, wood frame-backed walls, solid wood walls, and the like). Features and benefits extend to the wall-penetrating fasteners and may include decorative fastener head, color matching fastener/head, extended shoulder fasteners to facilitate easy removal, concealed fasteners, integrated fasteners and the like. Features that may be found on products with an anchorless-installed wall-mount bracket may include adjustable displacement of a rod cradle or hanging element from the wall, such as through use of a sliding extension mechanism, and use of a lead screw that adjusts an offset of the hanging element from the wall. For multi-rod hanging configurations (e.g., multiple rod cradles), the relative location and offset of such cradles can be preconfigured set as a default and in-field adjustable and the like. In embodiments, two or more rod cradles may be vertically aligned, on a single cradle arm, on separate cradle arms and the like. The two or more rods may be offset from each other vertically and/or horizontally to provide a wide range of curtain visibility options.

For curtain rod embodiments, a range of rod types may be supported through adaptation of, for example, a shape or function of a rod cradle. Rods that may be supported by an anchorless-installed wall-mount bracket may include café rod, swivel sash rod, round sash rod, flat sash rod, traverse rod, and the like. In embodiments, a bracket may be adapted to provide rod-specific support, such as to accept and securely support a round sash rod and the like. In embodiments, a multi-rod type bracket may be configured with a feature that supports in-field adaptation of a rod cradle to support rod-specific support features, such as a socket into which a rod-specific cradle can be configured at time of installation of the bracket. Additionally, further embodiments might include a bracket arm that is adjustable in its pitch, or angle relative to the wall, enabling, for example the raising or lowering of the load that is suspended from the bracket arm. Another feature may be adjustability of the bracket arm to the left and right along the wall, or rotation of the bracket arm to better position or secure the load. Furthermore, additional embodiments might include a bracket arm which is positionable in a plurality of positions on the wall-mount base, enabling minor adjustments of position during or after installation.

In embodiments, an anchorless-installed wall-mount bracket may be configured with integrated technology elements to improve utility, integrate with automated home functionality, improve comfort and convenience and the like. Exemplary integrations may include light sensing with motorized automated open/closing of a curtain, such as a traverse rod curtain; heat sensing to open/close curtains to avoid excessive heating or cooling of an interior space; light and/or heat sensing combined with an alert function, such as a wireless transmitter for use with a smart-home or comparable system; a level (e.g., an integrated bubble level) to ease accurate installation; laser level compatibility, such as with an element that illuminates (e.g., sparkles, glows, diffuses and the like) when impacted by a laser light, thereby facilitating accurate vertical orientation of multiple brackets.

The anchorless-installed wall-mount bracket may use simple and standard fasteners that are affordable and easy to procure if they are not included, resulting in a product that has a lower cost compared to standard installations using twice as many parts with a combination of anchors and screws. Installation of an anchorless-installed wall-mount bracket requires fasteners (e.g., nails, and the like) that are approximately one-half the cost of traditional fasteners (e.g., screw and anchor). Therefore, by merely adjusting how the bracket attaches to the wall, material costs are reduced. Additionally, this anchor-less installation approach allows complete and safe installation without requiring purchase or use of expensive tools such as a power drill (e.g., to prepare a wall to accept a wall anchor). This type of tool is required for installations that rely on anchoring; additionally, this type of tool may not be readily available to all end use customers. Further, the use of this product results in minimal damage to the wall (e.g., a couple of small nail holes), minimizing the need for time consuming and expensive repairs or expenses that may be resultant from wall damage, such as the loss of a security deposit for a renter and the like.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. Moreover, all of the information contained herein may be combined together (individually or wholly) or taken singly, as desired, to achieve varying embodiments of the invention and to add to the scope of the invention without limiting the invention to a particular embodiment. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims and/or information. Moreover, unless specifically stated any use of the terms first, second, etc. do not denote any order or importance, but rather the terms first, second, etc. are used to distinguish one element from another.

What is claimed is:

1. A rod bracket, comprising:
    a base forming an ellipse and comprising a base front, a base rear, a base top, and a base bottom, wherein the base defines an imaginary axis line drawn through a center of the base top defining a first vertex of the ellipse and a center of the base bottom defining a second vertex of the ellipse, and wherein the base further defines a first base mounting cavity proximate the base top that communicates with the base front and the base rear, and a second base mounting cavity proximate the base top that communicates with the base front and the base rear, wherein the first base mounting cavity is located on one side of the imaginary axis line and the second base mounting cavity is located on the other side of the imaginary axis line, wherein the first vertex, the first base mounting cavity and the second base mounting cavity form a triangle, wherein the base defines a first base front opening, a first base rear opening that is closer to the base bottom than the first base front opening, a second base front opening, and a second base rear opening that is closer to the base bottom than the second base front opening, wherein the first base front opening communicates with the first base rear opening via the first base mounting cavity, wherein the second base front opening communicates with the second base rear opening via the second base mounting cavity, and wherein the base bottom does not have any apertures proximate thereto;
    an arm extending away from the base front, wherein a first arm portion is integral with the base proximate the first base mounting cavity and the second base mounting cavity and a second arm portion continuously curved along its length and is integral with the first arm portion and the base, wherein the first arm portion and the second arm portion are spaced apart where they meet the base and the second arm portion is closer to the base bottom than is the first arm portion, wherein the first arm portion and the second arm portion meet at a distal arm end spaced from the base front that is at an arm length from the base and wherein the first arm portion and the second arm portion are in continuous contact from the distal arm end toward the base front past a midpoint of each of the first arm portion and the second arm portion, and wherein the arm is entirely located closer to the base bottom than are the first base front opening and the second base front opening; and
    a curtain rod support cradle at the distal arm end and integral with the arm, wherein the curtain rod support cradle defines a rod cavity for containing a curtain rod, wherein the first arm portion meets the base front at a first angle and the second arm portion meets the base front at a second angle, and wherein the first angle is greater than the second angle.

2. The rod bracket of claim 1 wherein the first base mounting cavity and second base mounting cavity are configured at an angle of 45° relative to a horizontal plane.

3. The rod bracket of claim 1 wherein the rod cavity is configured to at least partially contain a curtain rod.

4. The rod bracket of claim 1 wherein the cradle further defines a cradle mounting cavity having a cradle mounting cavity first opening and a cradle mounting cavity second opening, wherein the cradle mounting cavity first opening is communicated with the cradle mounting cavity second opening via the cradle mounting cavity.

5. The rod bracket of claim 4 wherein the cradle mounting cavity second opening is located so as to be within the rod cavity.

6. The rod bracket of claim 5 wherein the cradle mounting cavity further includes a threaded cavity surface such that when a rod mounting screw having a threaded screw surface is inserted into the cradle mounting cavity first opening and rotated, the threaded screw surface and the threaded cavity surface engage each other.

7. The rod bracket of claim 6 wherein the rod mounting screw is securely contained within the cradle mounting cavity such that a portion of the rod mounting screw is protruding from the cradle mounting cavity second opening.

8. A rod bracket, comprising:
- a base forming an ellipse and comprising a base front, a base rear, a base top, and a base bottom, wherein the base defines an imaginary axis line drawn through a center of the base top defining a first vertex of the ellipse and a center of the base bottom defining a second vertex of the ellipse, and wherein the base further defines a first base mounting cavity proximate the base top that communicates with the base front and the base rear, and a second base mounting cavity proximate the base top that communicates with the base front and the base rear, wherein the first base mounting cavity is located on one side of the imaginary axis line and the second base mounting cavity is located on the other side of the imaginary axis line, wherein the first base mounting cavity and the second base mounting cavity are equidistant from the imaginary axis line, wherein the first vertex, the first base mounting cavity and the second base mounting cavity form a triangle, wherein the base defines a first base front opening, a first base rear opening that is closer to the base bottom than the first base front opening, a second base front opening, and a second base rear opening that is closer to the base bottom than the second base front opening, wherein the first base front opening communicates with the first base rear opening via the first base mounting cavity, and wherein the second base front opening communicates with the second base rear opening via the second base mounting cavity, and wherein the base bottom does not include have any apertures proximate thereto;
- an arm extending away from the base front, wherein a first arm portion is integral with the base proximate the first base mounting cavity and the second base mounting cavity and a second arm portion continuously curved along its length and is integral with the first arm portion and the base, and wherein the first arm portion and the second arm portion are spaced apart where they meet the base and the second arm portion is closer to the base bottom than is the first arm portion, wherein the first arm portion and the second arm portion meet at a distal arm end spaced from the base front that is at an arm length from the base and wherein the first arm portion and the second arm portion are in continuous contact from the distal arm end toward the base front past a midpoint of each of the first arm portion and the second arm portion, and wherein the arm is entirely located closer to the base bottom than are the first base front opening and the second base front opening; and
- a curtain rod support cradle at the distal arm end and integral with the arm, wherein the curtain rod support cradle defines a rod cavity for containing a curtain rod.

9. A rod bracket, comprising:
- a base forming an ellipse and comprising a base front, a base rear, a base top, and a base bottom, wherein the base defines an imaginary axis line drawn through a center of the base top defining a first vertex of the ellipse and a center of the base bottom defining a second vertex of the ellipse, and wherein the base further defines a first base mounting cavity proximate the base top that communicates with the base front and the base rear, and a second base mounting cavity proximate the base top that communicates with the base front and the base rear, wherein the first base mounting cavity is located on one side of the imaginary axis line and the second base mounting cavity is located on the other side of the imaginary axis line, wherein the first base mounting cavity and the second base mounting cavity are equidistant from the imaginary axis line, wherein the first vertex, the first base mounting cavity and the second base mounting cavity form a triangle, wherein the base defines a first base front opening, a first base rear opening that is closer to the base bottom than the first base front opening, a second base front opening, and a second base rear opening that is closer to the base bottom than the second base front opening, wherein the first base front opening communicates with the first base rear opening via the first base mounting cavity, and wherein the second base front opening communicates with the second base rear opening via the second base mounting cavity and wherein the base bottom does not have any apertures proximate thereto;
- an arm extending away from the base front, wherein a first arm portion is integral with the base proximate the first base mounting cavity and the second base mounting cavity and a second arm portion continuously curved along its length and is integral with the first arm portion and the base, and wherein the first arm portion and the second arm portion are spaced apart where they meet the base and the second arm portion is closer to the base bottom than is the first arm portion, wherein the first arm portion and the second arm portion meet at a distal arm end spaced from the base front that is at an arm length from the base and wherein the first arm portion and the second arm portion are in continuous contact from the distal arm end toward the base front past a midpoint of each of the first arm portion and the second arm portion, and wherein the arm is entirely located closer to the base bottom than are the first base front opening and the second base front opening;
- wherein the first arm portion meets the base front at a first angle and the second arm portion meets the base front at a second angle, and wherein the first angle is greater than the second angle; and
- a curtain rod support cradle at the distal arm end and integral with the arm, wherein the curtain rod support cradle defines a rod cavity for containing a curtain rod and includes a curtain rod securing screw that is configured to engage with the curtain rod to securely hold the curtain rod within the rod cavity,
- wherein the ratio between the arm length and the distance between the first base rear opening and the base bottom is at least 1:1, and the ratio between the arm length and the distance between the second bracket base rear opening and the base bottom is at least 1:1.

10. A rod bracket, comprising:
- a base forming an ellipse and comprising a base front, a base rear, a base top, and a base bottom, wherein the base defines an imaginary axis line drawn through a center of the base top defining a first vertex of the ellipse and a center of the base bottom defining a second vertex of the ellipse, and wherein the base further defines a first base mounting cavity proximate the base top that communicates with the base front and the base rear, and a second base mounting cavity proximate the base top that communicates with the base front and the base rear, wherein the first base mounting cavity is located on one side of the imaginary axis line and the second base mounting cavity is located on the other side of the imaginary axis line, wherein the first vertex, the first base mounting cavity and the second base mounting cavity form a triangle, and wherein the base bottom does not include have any apertures proximate thereto;

an arm extending away from the base front, wherein a first arm portion is integral with the base proximate the first base mounting cavity and the second base mounting cavity and a second arm portion continuously curved along its length and is integral with the first arm portion and the base, and wherein the first arm portion and the second arm portion are spaced apart where they meet the base and the second arm portion is closer to the base bottom than is the first arm portion, wherein the first arm portion and the second arm portion meet at a distal arm end spaced from the base front that is at an arm length from the base and wherein the first arm portion and the second arm portion are in continuous contact from the distal arm end toward the base front past a midpoint of each of the first arm portion and the second arm portion; and a curtain rod support cradle at the distal arm end and integral with the arm, wherein the curtain rod support cradle defines a rod cavity for containing a curtain rod.

\* \* \* \* \*